(12) United States Patent
Hanson et al.

(10) Patent No.: US 6,490,585 B1
(45) Date of Patent: Dec. 3, 2002

(54) CELLULAR MULTIPROCESSOR DATA WAREHOUSE

(76) Inventors: Charles Albin Hanson, 1099 Lawnview Ave., Shoreview, MN (US) 55126; Thomas Winston Johnson, 12140 87$^{th}$ St. North, Stillwater, MN (US) 55082; Carol Jean O'Hara, 16374 Park Ave. SE., Prior Lake, MN (US) 55372; Koon-yui Poon, 801 191$^{st}$ St., SW., Lynnwood, WA (US) 98036; Roger Anthony Redding, 15212 NE. 16$^{th}$ Pl., #24, Bellevue, WA (US) 98007

(*) Notice: Subject to any disclaimer, the term of this patent is extended or adjusted under 35 U.S.C. 154(b) by 0 days.

(21) Appl. No.: 09/439,580

(22) Filed: Nov. 12, 1999

(51) Int. Cl.$^7$ .............................. G06F 17/30; G06F 7/00
(52) U.S. Cl. .......................... 707/10; 709/202; 707/103
(58) Field of Search ......................... 707/3, 10, 104.1, 707/103; 709/201, 202

(56) References Cited

U.S. PATENT DOCUMENTS

| | | | | |
|---|---|---|---|---|
| 5,590,319 A | * | 12/1996 | Cohen et al. ................... 707/3 |
| 5,664,182 A | * | 9/1997 | Nierenberg et al. ......... 707/103 |
| 5,884,312 A | * | 3/1999 | Dustan et al. ................ 707/10 |
| 5,899,990 A | * | 5/1999 | Maritzen et al. ................ 707/4 |
| 5,913,214 A | * | 6/1999 | Madnick et al. .............. 707/10 |
| 6,108,646 A | * | 8/2000 | Mohri et al. .................... 707/1 |
| 6,314,501 B1 | * | 11/2001 | Gulick et al. ............... 711/153 |

* cited by examiner

Primary Examiner—John Breene
Assistant Examiner—Susan Rayyan
(74) Attorney, Agent, or Firm—Phuong-Quan Hoang; Mark T. Starr; Lise A. Rode

(57) ABSTRACT

A number of partitions of a cellular multiprocessor (CMP) are connected to respective databases and form respective nodes of a data warehouse. Heterogeneous data stored across the nodes is accessed automatically in parallel at high speed from a user site using a simple script request containing a data source object name wherein the heterogeneous data is treated as a single data source object, the script further containing at least one method to be performed on the data source object. Respective agent processes are stored in memory dedicated to each partition and automatically generate descriptor files containing metadata corresponding to the data source object from a repository available to each partition. A messenger process transmits the new scripts to the appropriate nodes via memory-based messaging using a shared portion of the CMP memory. Respective agent processes at each node respond to automatically access the appropriate data and execute specified methods upon it.

28 Claims, 22 Drawing Sheets

FILE EDIT CUSTOMIZE IMPORT GENERATE LAYOUT HELP

DATA FLOW COMPUTATION MULTIMEDIA INTERNET DATABASE DEBUG USER

```
#IMPORT  CLIENT
#IMPORT  PERSONNEL
PRIVATE  CHAR [ ] BUF;
MAIN ( ) {
    CLIENT.READ (BUF);                          // READ BIRTHDATE FROM USER
    PERSONNEL.SEARCH (IF BIRTHDATE == BUF);     // SEARCH FOR BIRTHDAYS EQUAL
    THIS.FORMAT ("%S, "%S, "%S, "%S, "%S, "%S, LASTNAME, FIRSTNAME, ADDRESS, CITY, STATE, SSN, PHONE);
    CLIENT.WRITE (THIS);                        // OUTPUT DATA TO CLIENT
// MAIN
}
```

*FIG. 19*

ENTER BIRTHDATE

LAST NAME

FIRST NAME

ADDRESS

CITY

STATE

SSN

PHONE

NEXT

CELLULAR MULTIPROCESSOR DATA WAREHOUSE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The subject invention relates to data processing and data storage systems and more particularly to a cellular multiprocessor configured as a data warehouse simply accessible at extremely high speeds.

BACKGROUND OF THE INVENTION AND RELATED ART

Present technology is witnessing the development of large remote databases or "data warehouses", as well as rapid expansion of the Internet and proliferation of corporate intranets. Demand is growing for increasingly large and rapid data transfers involving streaming video, visualization graphics and large data warehouse downloads over such new network protocols as the Fast Ethernet and Gigabyte Ethernet. The data which it would be desirable to access may be stored across heterogeneous sites, i.e., sites which contain different types of database systems or other data containers. Hence the data which may need to be accessed may be referred to as "heterogeneous data".

Computer system technology for large scale processing of data has also continued to evolve at a rapid place. A recent advancement has appeared in the form of the so-called cellular multiprocessor or "CMP", disclosed, for example, in U.S. patent application Ser. No. 09/215,424, filed Dec. 18, 1998 now U.S. Pat. No. 6,314,501, issued Nov. 6, 2001. The CMP architecture allows operating systems to operate in different partitions within a single computer architecture and permits the different partitions to communicate with one another through shared memory. Memory bottlenecks in prior art systems such as the SMP (Symmetric Multiprocessor) are eliminated through use of high speed main frame-class cross bar switching technology.

Our pending application Ser. No. 09/405,038 filed Sep. 24, 1999, and incorporated by reference herein discloses a system providing automatic parallel accessing, extraction and manipulation (e.g., sorting) of data from multiple heterogeneous data sites in response to a simple query or request from the user. A query may constitute a search or sort request or a myriad of other queries. An interpreter or "Agent", receives a query or request, e.g., in the form of a JAVA script, and may for example, break the script into new scripts respectively appropriate for each node of a distributed system.

The system of our co-pending application further provides a method for metadata-based high level abstraction of a federation of clustered or distributed heterogeneous databases and/or data files in which the federation of databases is and concurrent execution of object methods across the distributed data. The single object is referenced hereafter as the "data source object," sometimes abbreviated to simply "data object."

This specification uses the trademarks JAVA™, ORACLE™, UNIX™, SOLARIS™, VISUAL BASIC, and ACTIVEX. These trademarks appear in the specification either with all letters capitalized or with only the first letter capitalized. Generic terminology for each of these trademarks is as follows:

JAVA™—An object oriented programming language developed by Sun Microsystems.

ORACLE™—Oracle Corporation is an industry leader in the development and sale of database technology.

UNIX™ A multiuser, multitasking operation system originally developed by AT&T.

SOLARIS™—A distributed UNIX-based computing environment created by Sun Microsystems.

VISUAL BASIC™—A high-level visual programming language developed by Microsoft for building Windows applications.

ACTIVEX—A set of technologies developed by Microsoft that enables software components to interact with one another in a networked environment.

SUMMARY OF THE INVENTION

According to the invention, the methods and apparatus of our co-pending application are advantageously mapped onto the CMP architecture to create an extremely high performance data warehouse with great ease of use. In particular, a CMP is divided into a plurality of partitions. Each partition contains an operating system and has access to a database or databases via one or more "Direct I/O Bridges" within the partition. A repository of metadata describing the categories of the data sources and other system attributes is contained in an area of CMP memory shared by each of the partitions. Each CMP partition further has its own messenger and agent code modules stored in memory dedicated to that partition, i.e. unshared memory. These modules facilitate parallel accessing, extraction and manipulation of data contained in all of the databases in response to a single script or request from a user wherein the data to be accessed is referenced as a single object. A plurality of such CMP data warehouses may be configured into a local or distributed system where searches and other methods may be performed on all the servers or databases of the entire system.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

Figure 21:
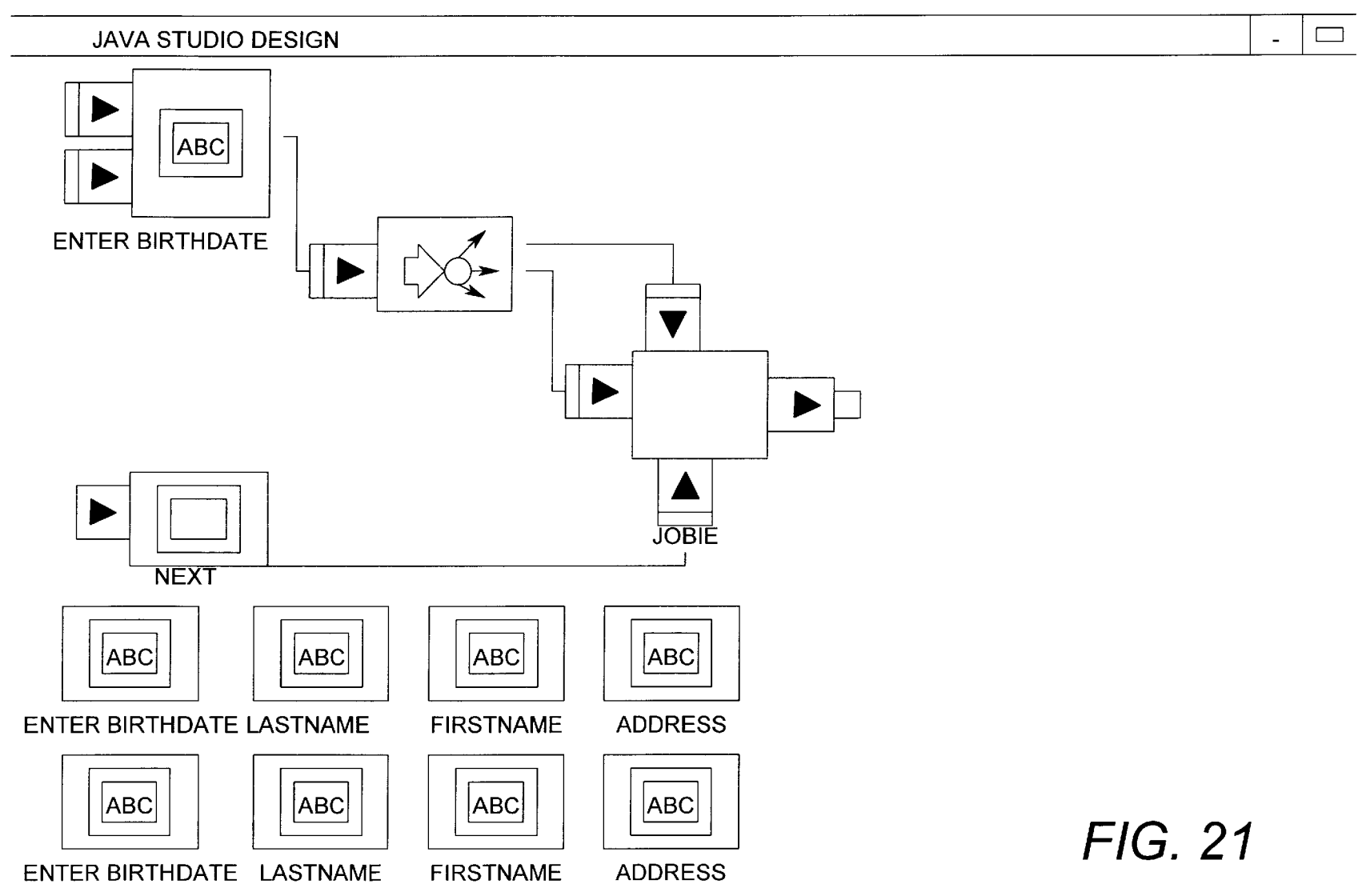

FIGS. 16–18 and 19–22 illustrate respective Java Studio design panels adapted to form part of an alternate embodiment.

DETAILED DESCRIPTION OF ONE EMBODIMENT

Figure 1:
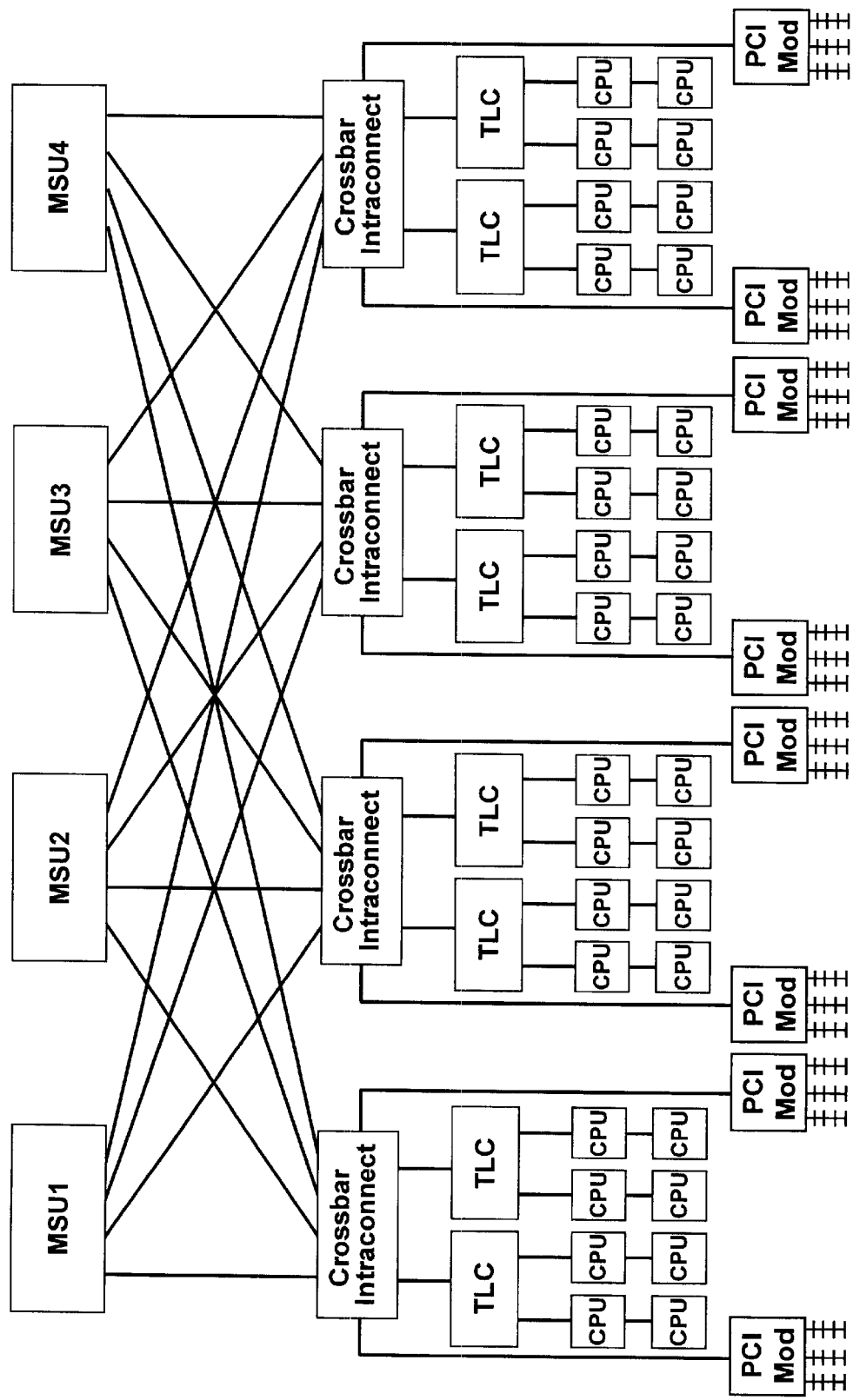
FIG. 1 is a system block diagram of a cellular multiprocessor (CMP)

The architecture of a cellular multiprocessor (CMP) is shown in FIG. 1. In one embodiment, the CMP platform employs Intel micro processors such as the Itanium. A design goal of the CMP architecture was to bring a mainframe-class NT processing system to the marketplace, providing an industrial-strength platform to run the complete suite of off-the-shelf Windows applications—while still permitting the use of the other prevalent operating systems, including Unisys enterprise server operating systems and associated applications.

The CMP platform illustrated in FIG. 1 is constructed from a set of modular components. Up to four Intel processors share two Intel memory buses connected to a Level 3 memory cache or TLC. Two such "sub-pods" and a pair of Direct I/O Bridges, each connected to 3 PCI I/O buses, are connected via a crossbar to each of 4 memory storage units (MSU's). Each MSU supports up to 16 GB of memory. Each PCI bus supports up to 4 PCI slots. Up to 4 crossbars can interconnect up to 64 GB of memory, up to 96 PCI I/O slots, and up to 32 Intel iA32 or iA64 processors. The system may be configured as a 32x SMP, or as 2 16x, 4 8x or 8 4x partitions.

Each sub-pod thus consists of four processors (CPU's) and a shared cache (TLC). Each element or sub-pod can run its own operating system. One or more sub-pods can be combined to run an operating system. The configuration can be adjusted from a console.

A significant difference between the CMP and other architectures is its main memory design. The main memory has defined therein at least one shared memory window to which each partition has shared access. Program code executing on different partitions enables those different partitions to communicate with each other through the shared memory window.

Additionally, for each different partition configured within the CMP computer system, the main memory has defined therein an exclusive memory window to which only that partition has access and in which the operating system of that partition executes. The separate operating systems on two different partitions may be different operating systems, or may be different instances of the same operating system. Processor-to-memory latency is the same for each processing module across all of the main memory. When a single CMP system is partitioned into multiple separate systems that are clustered, the CMP shared memory architecture enables the server partitions to transfer information at memory speeds, rather than at the lower, conventional, clustering network-interconnect speed. Further details on the construction and design of a suitable CMP are contained in U.S. patent application Ser. No. 09/215,424 filed Dec. 18, 1998 and applications referenced therein, all of which are incorporated by reference herein at this point.

The CMP system employs a 4×4 crossbar architecture. The crossbar is a non-blocking electronic switch similar to those used in many mainframe-class systems. The designation "4×4" comes from four crossbar interconnects (one for each pair of sub-pods) connecting to the four memory modules. All memory is visible uniformly to all processors via crossbars. In effect, each crossbar has its own direct connection to every memory module. In addition, the CMP system is considered four-in and four-out, as if each connection were bi-directional. Because of its parallelism, a crossbar interconnect improves performance and eliminates the bottlenecks found in prior art bus-based SMP architectures. Access is unimpeded between the local components, removing potential bottlenecks between the processors, memory and PCI devices.

Figure 2:
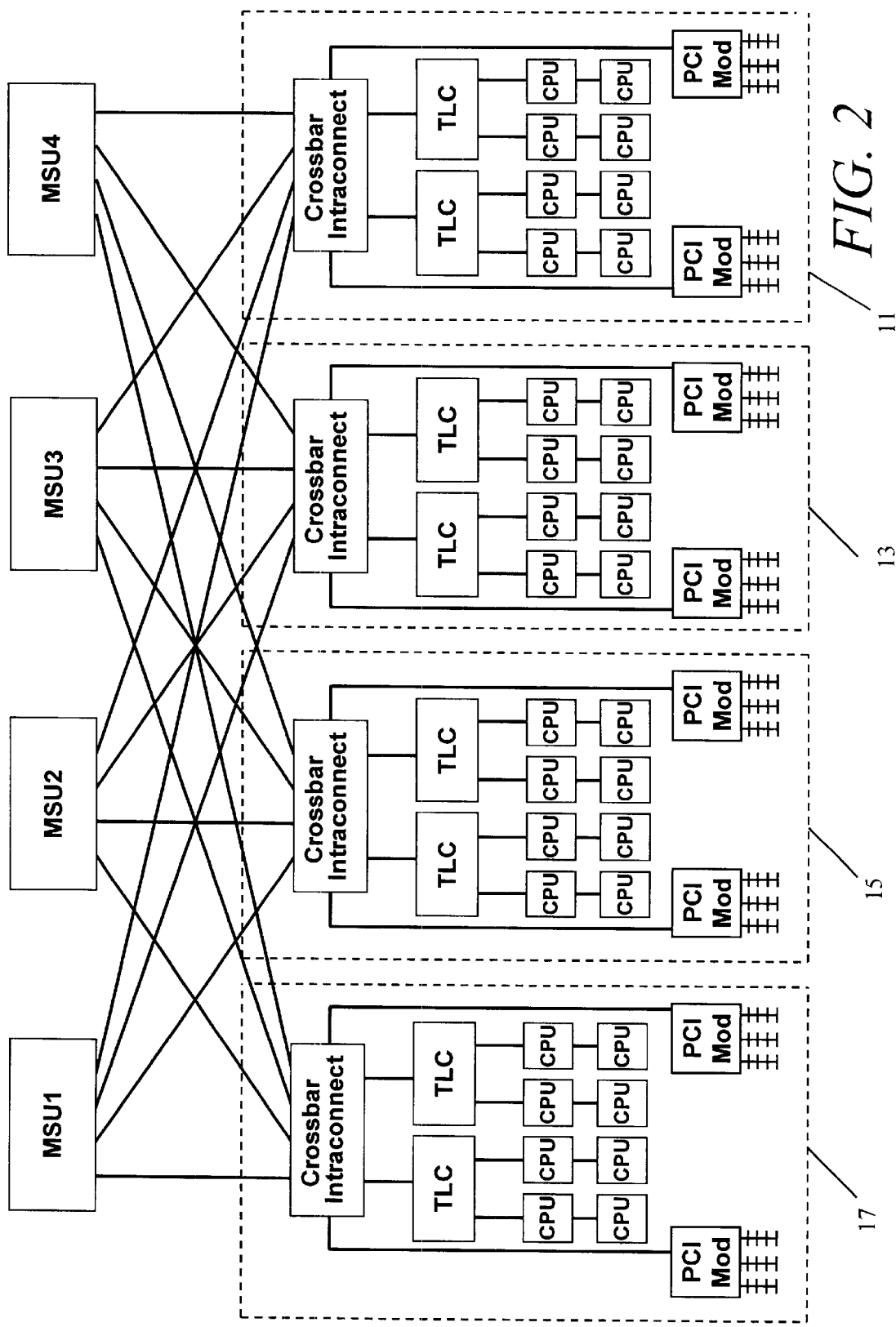
FIG. 2 is a system block diagram of a cellular multiprocessor as partitioned according to preferred embodiment

According to the preferred embodiment, the CMP of FIG. 1 is partitioned, for example, into four partitions 11, 13, 15, 17 as shown in FIG. 2. Each of these partitions 11, 13, 15, 17 is treated as a Node of a massive data storage and retrieval system or "data warehouse", as shown in FIG. 3.

Figure 3:
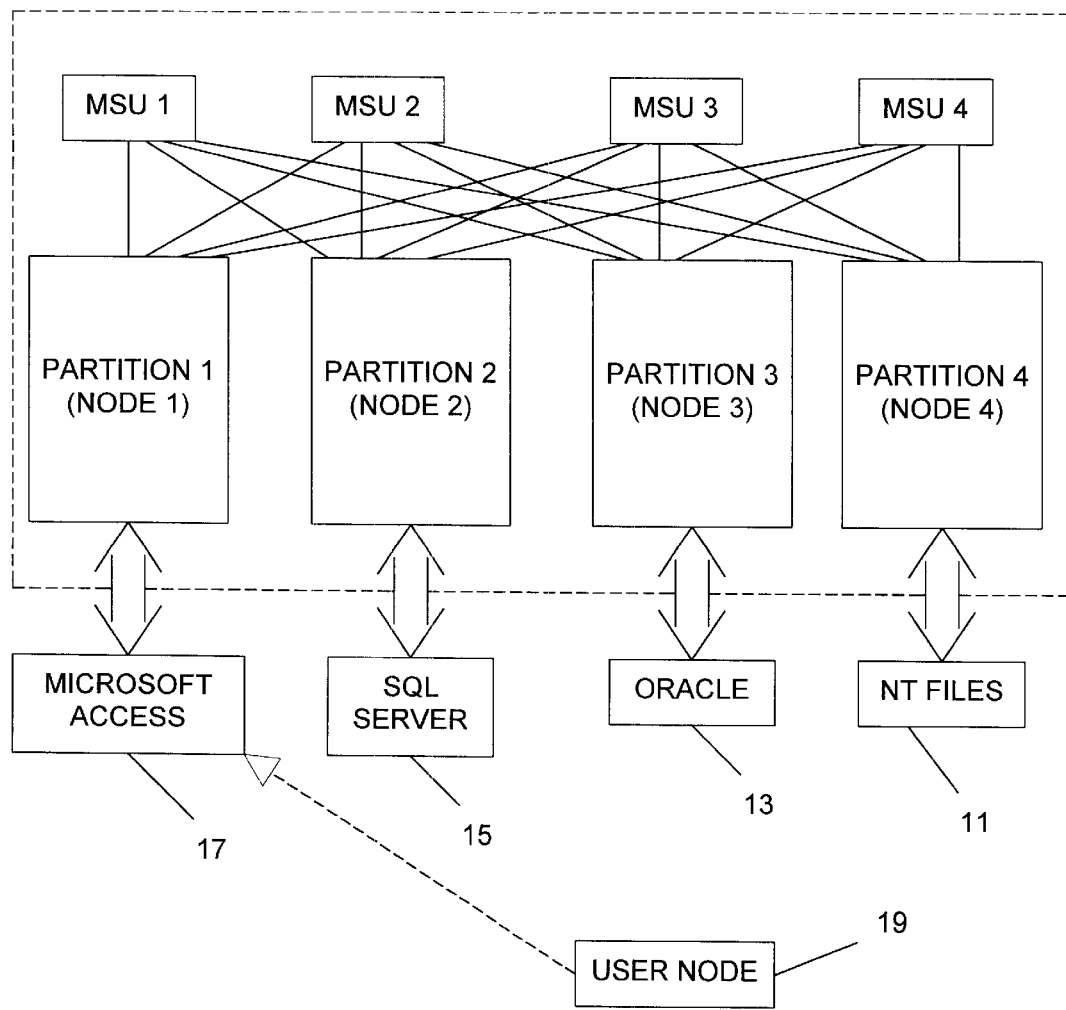
FIG. 3 is a system block diagram of a cellular multiprocessor illustrating a preferred embodiment of the invention.

In FIG. 3, each partition 11, 13, 15, 17 further includes a different operating system (e.g., NT 4.0, Windows 2000®, Unix, <Unix Base>, Solaris, etc.). Each partition further interfaces with a different type of database, e.g., Oracle, SQL Server, NT, etc. Each partition could also employ the same operating system and database or any combination of the same and dissimilar operating systems and databases. Additionally, a "server" including agent and messenger code modules resides on each of the nodes 11, 13, 15, 17. Each server is preferably stored in the exclusive memory portion of each partition (node). The agent and messenger associated with the user site is referenced herein as the "local" agent and "local messenger and are stored in the MSU of the partition to which the user terminal (server hardware) is connected. The messengers employ a Winsock interface and execute memory-based messaging via the CMP shared memory to transfer messages between partitions.

The servers provide the ability to treat the heterogeneous databases as a single object and to access the data and perform methods on the data using a simple script wherein the data to be accessed is represented by a single data object The "user site" is typically a PC or Workstation which connects by wire (e.g. gigabit/sec. Ethernet) to a LAN card in a PCI slot in a Direct I/O Bridge for the partition (e.g., node 17) in question (the "local" partition). The implementation of the servers permits the individual and diverse databases to be treated and viewed by the user as a single large database, while the individual databases need not scale above the size of the partition (i.e., "4×8" in the example under discussion). Because it is currently difficult to make efficient use of more than eight processors when running an operating system such as NT, the 4×8 partitioning provides a particularly optimized and highly effective apparatus. Thus, a large and very rapidly accessible data warehouse results. In this manner, a CMP can be used to consolidate various database/servers such as Oracle, SQL Server and Unix.

Figure 4:
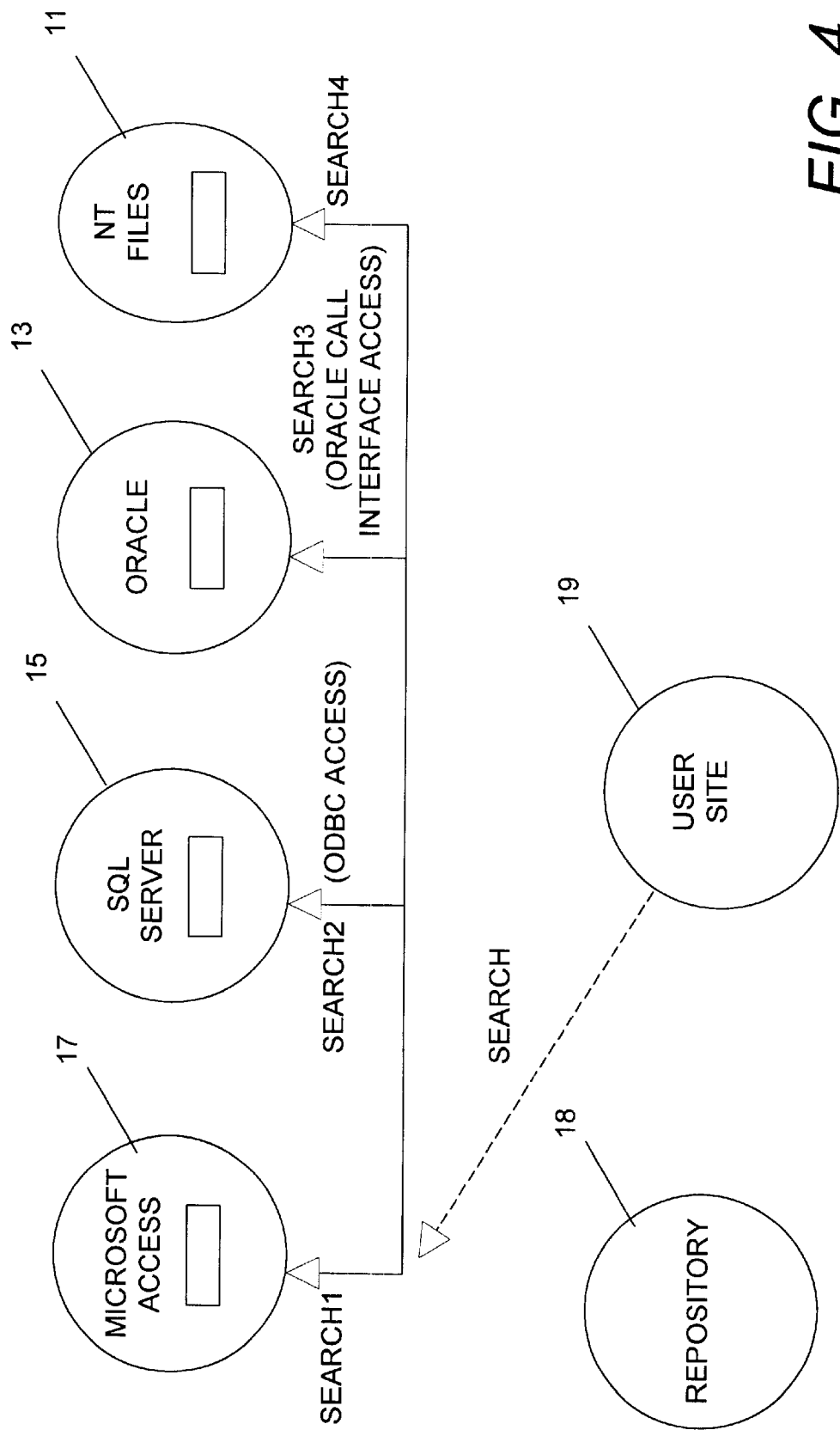
FIG. 4 is a system block diagram illustrating a method and apparatus according to the preferred embodiment of the invention.

The structure and operation of the servers at each node will now be discussed in more detail, beginning with an illustrative example. According to this example, illustrated in FIG. 4, a user at a user site or node 19 propounds a simple request, which automatically sets in motion concurrent, parallel accessing of all the databases 11, 13, 15, 17. The request illustrated in FIG. 4 is a search request and the parallel searches are referenced respectively as Search 1, Search 2, Search 3 and Search 4. The searches provide parallel access to the heterogeneous data using a metadata approach and treating the heterogeneous data as if it were a single object.

The simple query or request is first interpreted at the node (partition) to which the "user site" is connected. The relevant part of the script is passed to each one of the nodes (partitions) 11, 13, 15, 17 which contain the distributed data. In the embodiment under discussion, queries or requests are presented as JAVA scripts.

Each of the searches is optimized with respect to the underlying data. For example, there are a number of ways of accessing the Oracle database, such as via an OBDC connection or via the Oracle Call Interface. According to the preferred embodiment, the method used to access the Oracle database is via the Oracle Call Interface. This method is optimum for the purpose of the preferred embodiment because it provides the shortest path length to the data. Thus, standard database interfaces are used, while selecting the one which provides the shortest path length. The user writing the query statement is unaware of the approach used to actually access the data.

Figure 13:
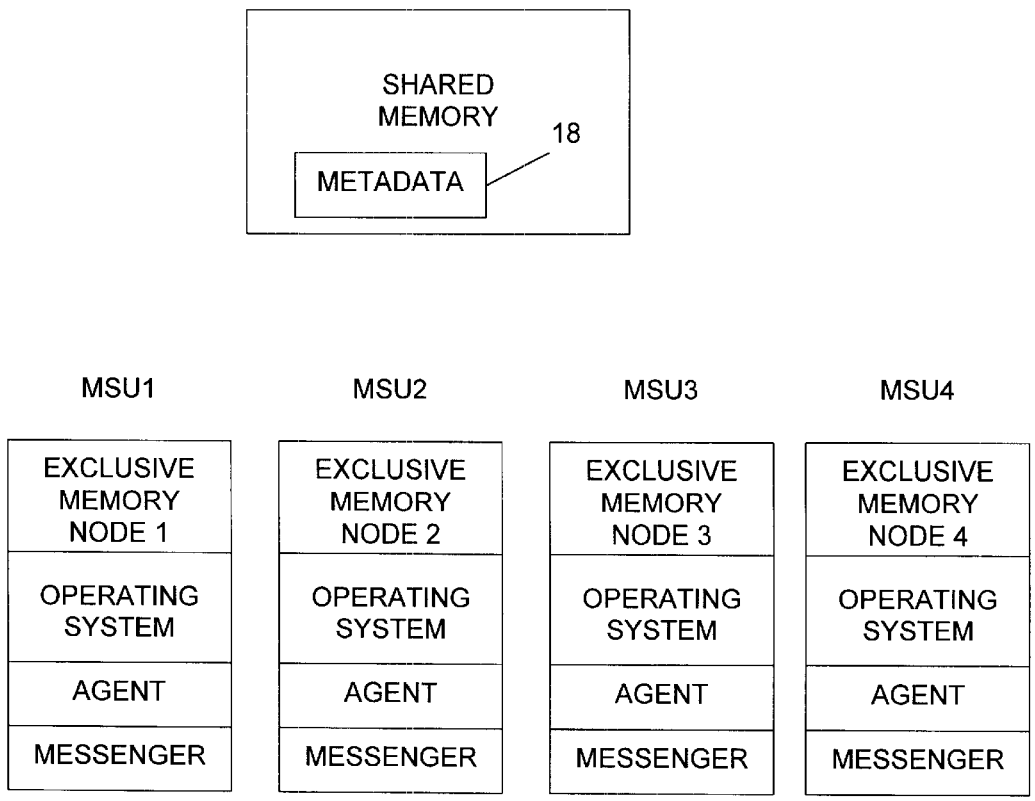
FIG. 13 is a block diagram illustrating memory structure according the preferred embodiment.

The metadata describes the contents of the data object of a request (query). The metadata is contained in a repository 18, using data object models which describe the overall federation of servers and data sources. In the CMP embodiment under discussion, the repository 18 is contained in the memory space shared by each partition (with back-up to permanent storage) such that the metadata is accessed at memory speeds. The resultant CMP memory structure is illustrated in FIG. 13, where metadata repository 18 is shown residing in shared memory and agent and messenger modules are shown residing in the dedicated memory portion of each node.

In the preferred embodiment, there are four categories of data source objects:
  Distributed over the nodes of a cluster
  Distributed over a network
  Distributed over an SMP (symmetric multiprocessor)
  Not distributed A distributed network can be an Ethernet or nodes on a cluster or a gigabit/sec connection.

A repository application generates a set of data source descriptor files automatically from the metadata at run-time. The data descriptor files contain only the metadata corresponding to the data source object contained in the user-written script.

The descriptor files are held locally in memory unit back up to NT flat files, and are used at run-time in the interpretation of the query requests. The use of optimized local files further supports high run-time performance. The repository 18 used according to the preferred embodiment is the Unisys Repository (UREP). Various other repositories could be used, for example, Microsoft's repository.

The descriptor file name is also used as the name of the data object in the query scripts, which data object represents the highest level of abstraction of the federation of data in question. For example, the descriptor file corresponding to an object, cluster population, would be called "cluster population." A user might write a query, for example:

cluster.population.search (if (bdate==xx/xx/xx)), searching the population (perhaps the population of the United States) for all persons with a particular birthdate. As discussed in detail below, an "agent" interpreting this script will refer to the local descriptor file, cluster population, to determine the nature of the object.

In the case of FIG. 4, the metadata indicates that the data is contained in the SQL Server, Oracle and/or NT files databases 11, 13, 15 and sets forth the organization of all the data in the respective databases, e.g. the columns and rows and how to interpret the data stored in the database. Accordingly, the user at site 19 does not need to know the data structure and is thus writing applications at a transparent level, i.e., treating the whole network as a single object and writing methods on it.

A special interpreter or "agent" process is employed at the node (partition) to which the user site is connected, which interprets the script/request and "looks up" the appropriate metadata from the NT descriptor file. This agent then sends appropriate scripts to the particular nodes 11, 13, 15 and/or 17 which contain data corresponding to the data object. An agent (interpreter) module located at each selected node interprets and executes the received scripts.

As noted, each agent comprises a module of code (an NT process or the equivalent in another operating system). Thus, two levels of interpretation are employed, a first to interpret the script and a second to interpret and execute the interpreted script at the appropriate nodes. As much processing as possible is performed close to the data, i.e., at the physical sites where the data is stored, in order to minimize message traffic between user and nodes. Thus, a function shipping model is used.

According to the example being discussed in connection with FIG. 4, the agent at each node, 11, 13, 15, 17 receives the interpreted client request, which includes a data source object name and the methods to be applied, which were originally embedded in the script generated by the user. The agent determines from the data source object (1) whether the data is distributed, and if so, (2) the way in which it is distributed. These details (1) and (2) are contained in the repository 18 of metadata. Once armed with items (1) and (2), the remote agent performs the required method(s) upon the data.

Figure 5:
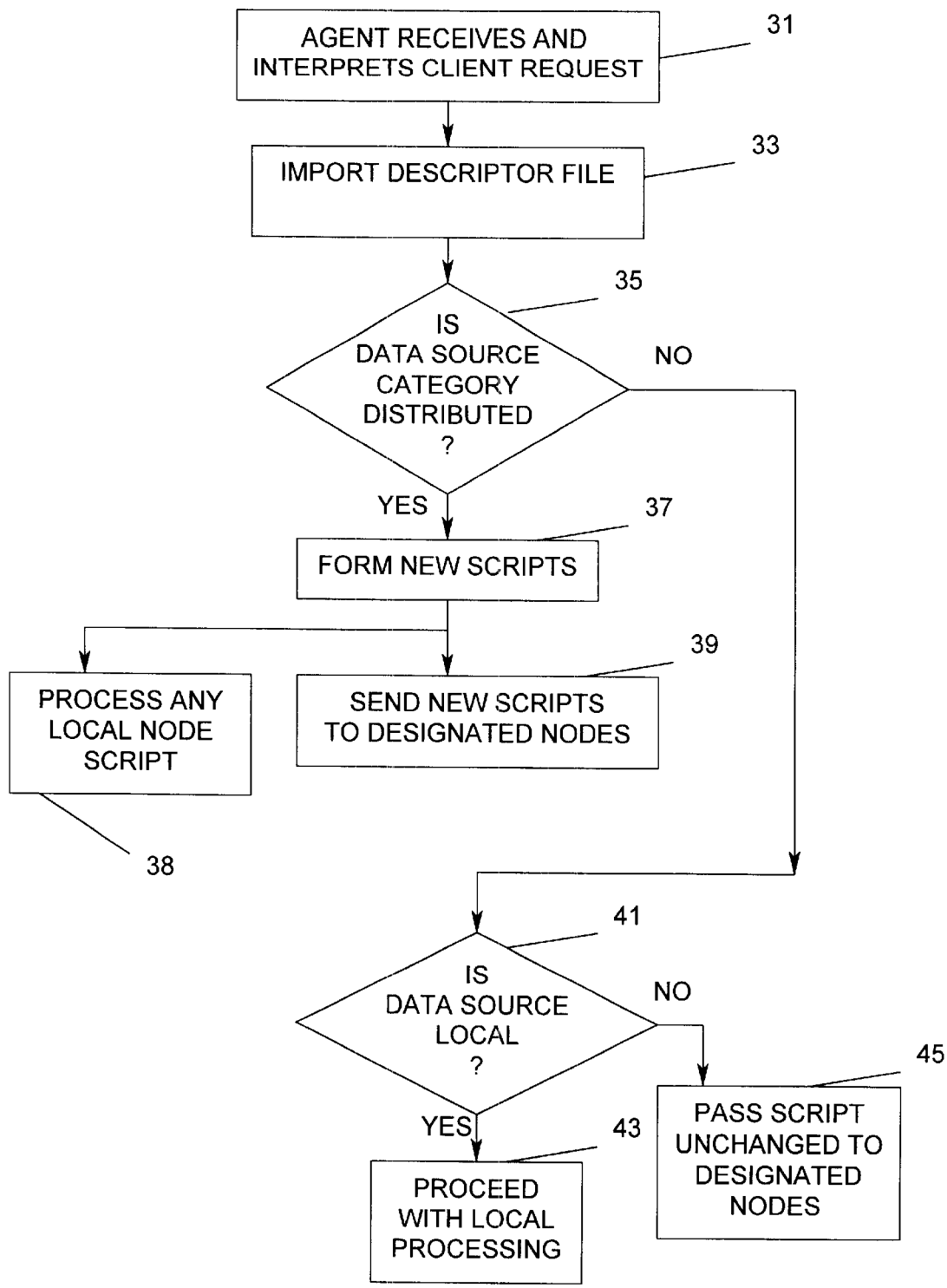
FIG. 5 is a flow diagram illustrating structure and operation of an agent process according to the preferred embodiment.

The first level (local) interpretation of the two level interpretation process will now be further detailed in conjunction with FIG. 5 and an illustrative example of operation according to the preferred embodiment of the invention. This example considers the client request as being received by an agent at the node (partition) 17. [although the request could be received by an agent at a remote site.]

According to step 31 of FIG. 5, an agent at the node (partition) 17 first receives the client request, which, in the preferred embodiment is in the form of a Java script. The agent at the node (partition) 17 then interprets the script. The data source object name (e.g., C_sql_data) is embedded in the script, as are the methods to be invoked on the referenced data source (e.g., "sort" in C_sql_data.sort(state(d)).

The data source object is categorized by whether it is distributed, and the way in which it is distributed. The category of the data source object is specified in the data source descriptor file. As noted above, the latter is a text file with the same name as the data source object itself, i.e., C_sql_data.

At the beginning of the local interpretation of the script, the local agent imports the descriptor file, step 33 of FIG. 2. In step 35, the local agent examines the descriptor file and determines the next processing step, depending on the category of the referenced data source object.

If, in step 35, the data source category is determined to be "distributed," the agent proceeds to step 37 and breaks the script into new scripts appropriate to the designated nodes. The new scripts are then sent to the designated nodes for further concurrent processing, step 38, 39 of FIG. 5. The agent on the processing node checks the data source type to determine the next processing step (there are three data source types: NT file system, SQL Server, Oracle)—and then proceeds with the processing.

If, in step 35, the local agent determines that the data source is non-distributed[2], the agent proceeds to the test 41 to check to see if the data source location is local or not. If not local, the agent passes the script unchanged to the designated node, step 45, if local, the agent checks the data source type for next processing step and proceeds with processing, step 43.

The following code provides an example of local interpretation of the user script, C_sql_data.sort(state(d)), presented at node 1 of a cluster e.g. node (partition) 17:

```
#import C_sql_data
main () {
    C_sql_data.search(if (b_date == xx/xx/xx))
Descriptor file C_sql_data resembles:
    SERVER = 1(sql_data), 3 (sql_data), 5 (nt_data)
    }
Descriptor file sql_data resembles:
    SERVER = 1; MS; sql_data = publish:authors;
    {
            au_id*    unique    CHARACTER(11)
                :
            State*    null      CHARACTER(2)
                :
}
```

According to this example, a data source object, C_sql_data, is searched for persons with a particular birthdate. A data source descriptor file, with the same name as the data source object, indicates that C_sql_data is distributed across Nodes servers 1,3,5 of a cluster. Descriptor files on each node give details of the data distributed on that node (in this case, the data is in SQL Server databases on servers 1 and 3, and in an NT file system on server 5).

The agent on local server 1 begins execution of the script by importing the data source descriptor file, C_sql_data. The category of the data is "cluster," the hosting server is "1" with the data distributed on servers 1,3 and 5. The agent processes the statement. In due course, the agent will check the syntax and verify, for example, that "b_date" is specified as a column in the descriptor of the sql_data object.

In processing the statement, the agent breaks the script into sql_data.search( ) for server 1;

sql_data. search( ) for server 2;

nt_data. search( ) for server 5

The agent on server 1 processes the first statement; the second statement is sent to server 3; and the third statement is sent to server 5. There is an object with a descriptor file name, sql_data, on server 3 and an object with a descriptor file name nt_data on server 5. After the processing (sorting) at each node, the information is returned to the original (coordinating) agent for final processing.

By using a function shipping model, in which the search commands are sent to be executed as close to the data as possible, and only the results ("hits") are returned to the requester, the network traffic is minimized (compared with a data shipping model, in which all the data might be sent to the requester, and the search performed there). In the event that updates are involved, the approach also ensures that there will never be a later update in another server's cache, thus maintaining cache coherency across servers.

Figure 6:
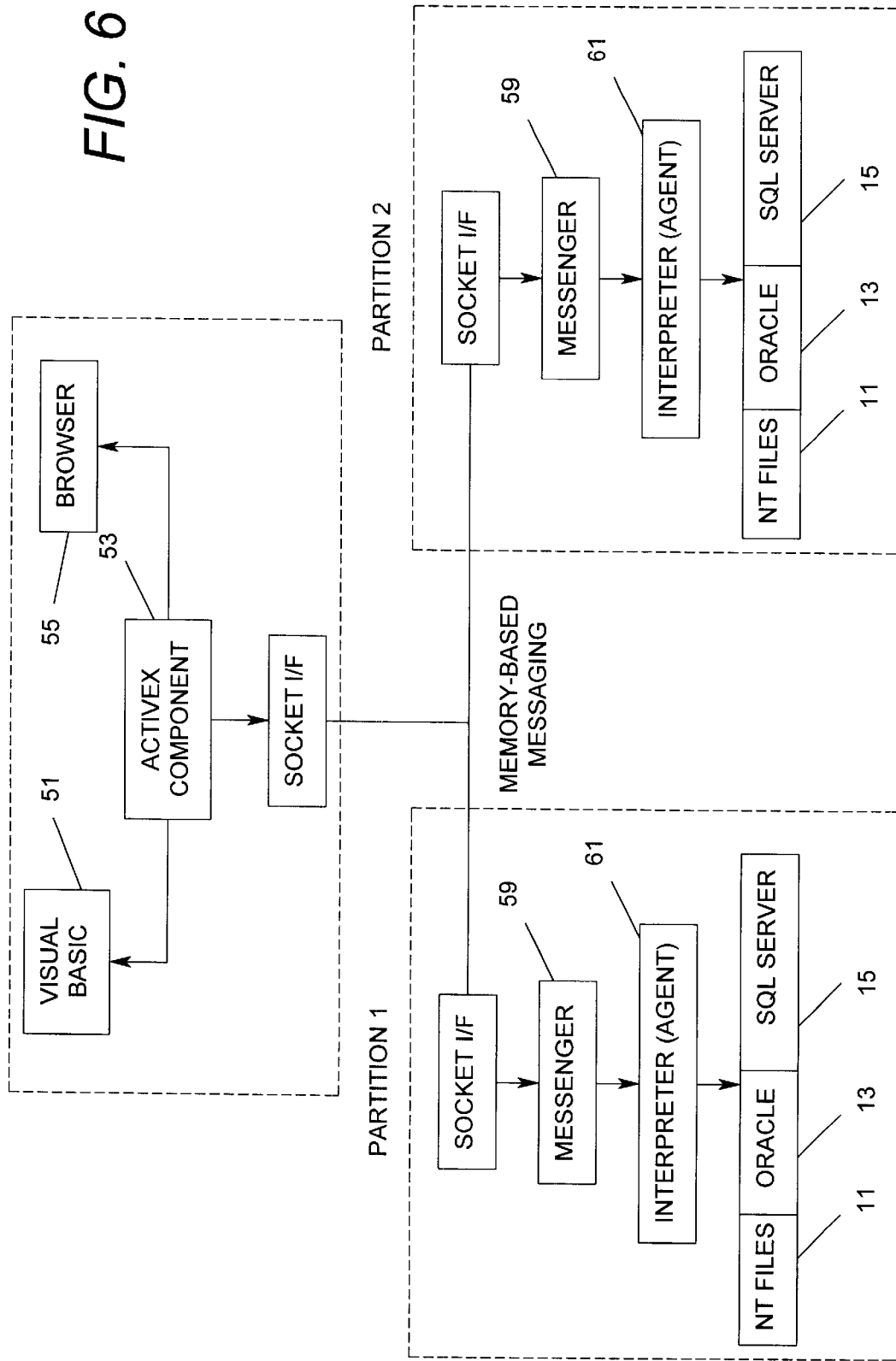
FIG. 6 is a block diagram illustrating system architecture according to the preferred embodiment.

FIG. 6 provides an illustrative system architecture. According to FIG. 6, a Visual Basic client 51, a browser 55, or an Active Server Page, interfaces to an ActiveX component 53. The client sets information to describe its request (e.g., the name of a file containing a script to be executed) in a table within the ActiveX component 53 and calls a "send" method within the component. The ActiveX component 53 interfaces with a Messenger code module 59 via a Sockets interface. In this way, the apparatus appears to the client to be an ActiveX component.

The "messenger" 59 listens for messages from the Sockets interface 57, and its operation is illustrated in connection with FIG. 7. This module of code contains two key NT or Unix threads (or the equivalent for other operating systems): a send thread and a receive thread. The receive thread listens for new messages from a client or from an agent. The send thread returns results to the client, or sends requests to another server.

Figure 7:
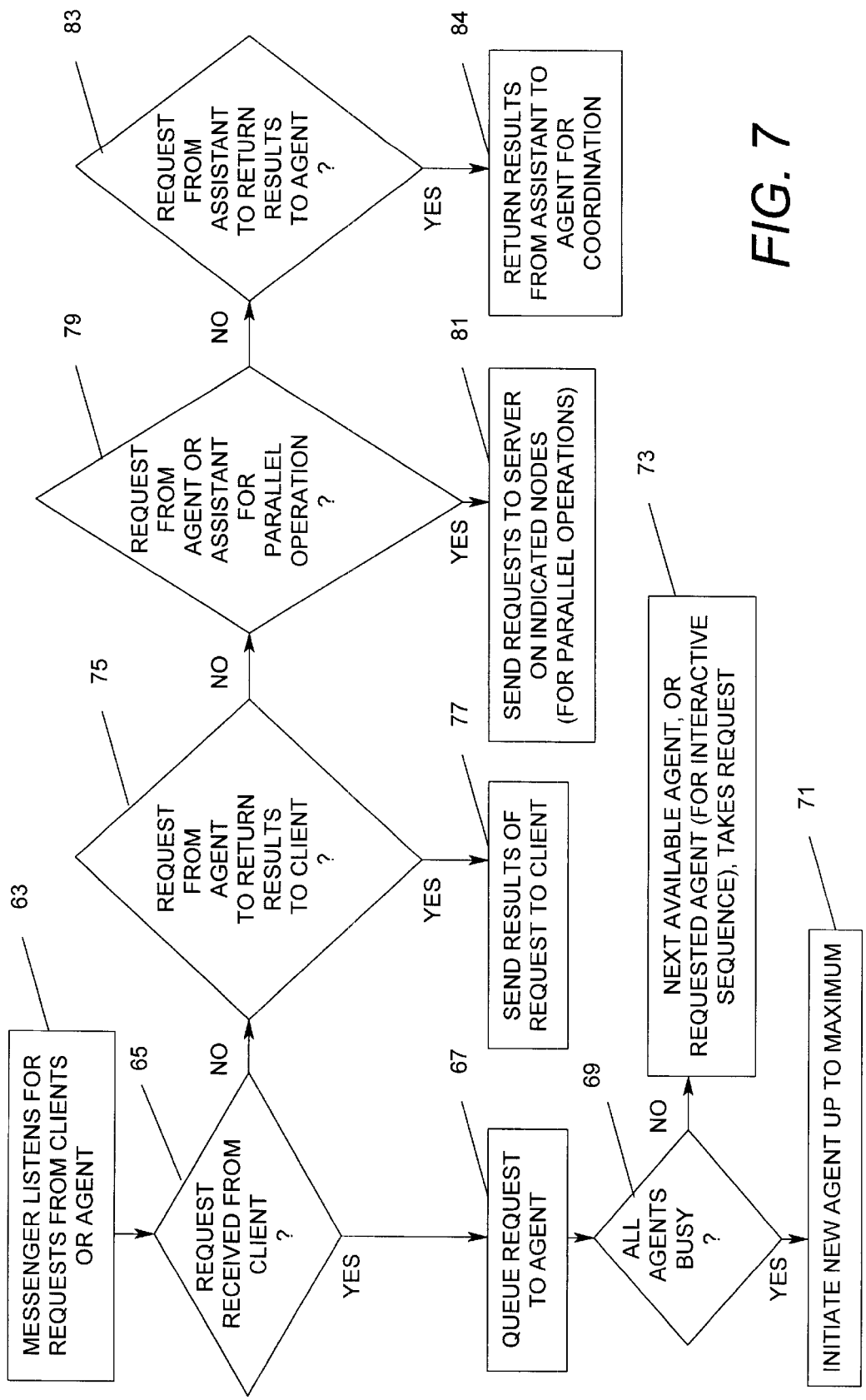
FIG. 7 is a flow diagram illustrating a messenger process according to the preferred embodiment.

As indicated by steps 63, 65, 67 of FIG. 7, on receiving a message from the Sockets interface 57, the messenger 59 queues the request for interpretation by an "agent" process 61, which analyzes the message and performs the request. If, on receipt of a message, the messenger 59 detects that all agent processes are busy at test 69, additional agents may be created, step 71, up to a maximum, using standard NT or Unix or equivalent operating system process initiation calls. If all agents are not busy, the next available agent process will interpret the request, as indicated by step 73.

On detecting that the data is distributed, the agent breaks the script into the appropriate scripts for each data source as discussed above and queues a request to the "messenger" process to send these scripts to the respective distributed servers to be processed in parallel. Thus, if successive "NO's" occur at tests 65 and 75 of FIG. 7, and a "YES" results at test 79, parallel requests are sent out 31. The receiving "messenger" process at the destination server queues the request to an "assistant agent" (which differs from an "agent" only in that it is always invoked from, and replies to, another "agent," rather than to an external client). The assistant agent interprets the script (for example, a "search" of local data), queuing the results and presenting a request to the local "messenger" for return to the requesting agent.

Thus, when test 83 of FIG. 7 is satisfied, results are returned to the originating agent in step 84 where the results are then consolidated. The agent may then request the messenger to return results to the client, test 75, step 77. In this way, automatic execution of methods is achieved across distributed heterogeneous data (in NT files, SQL server, Oracle, . . . ) transparently to the requester without the writer of the request (script) having to be aware of where the data is located, how it is accessed, where the methods execute or how they were created. If the data is distributed, the execution runs automatically in parallel. With implementation of the agent and messenger models on different operating systems, the servers may run on a heterogeneous mix of NT, Unix, 2200, A-Series, IBM, . . . etc.

Figure 8:
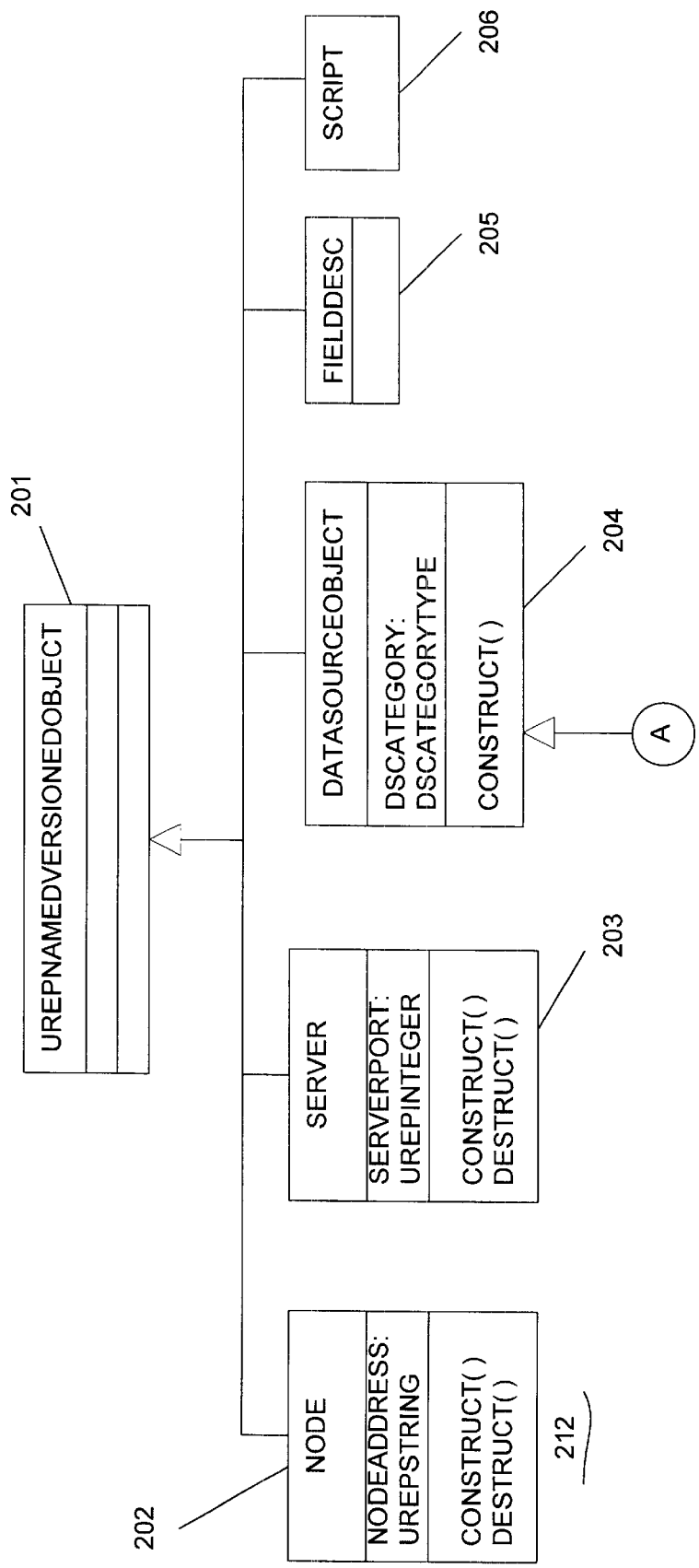
FIGS. 8–10 comprise an inheritance diagram illustrating metadata employed according to the preferred embodiment.
Figure 9:
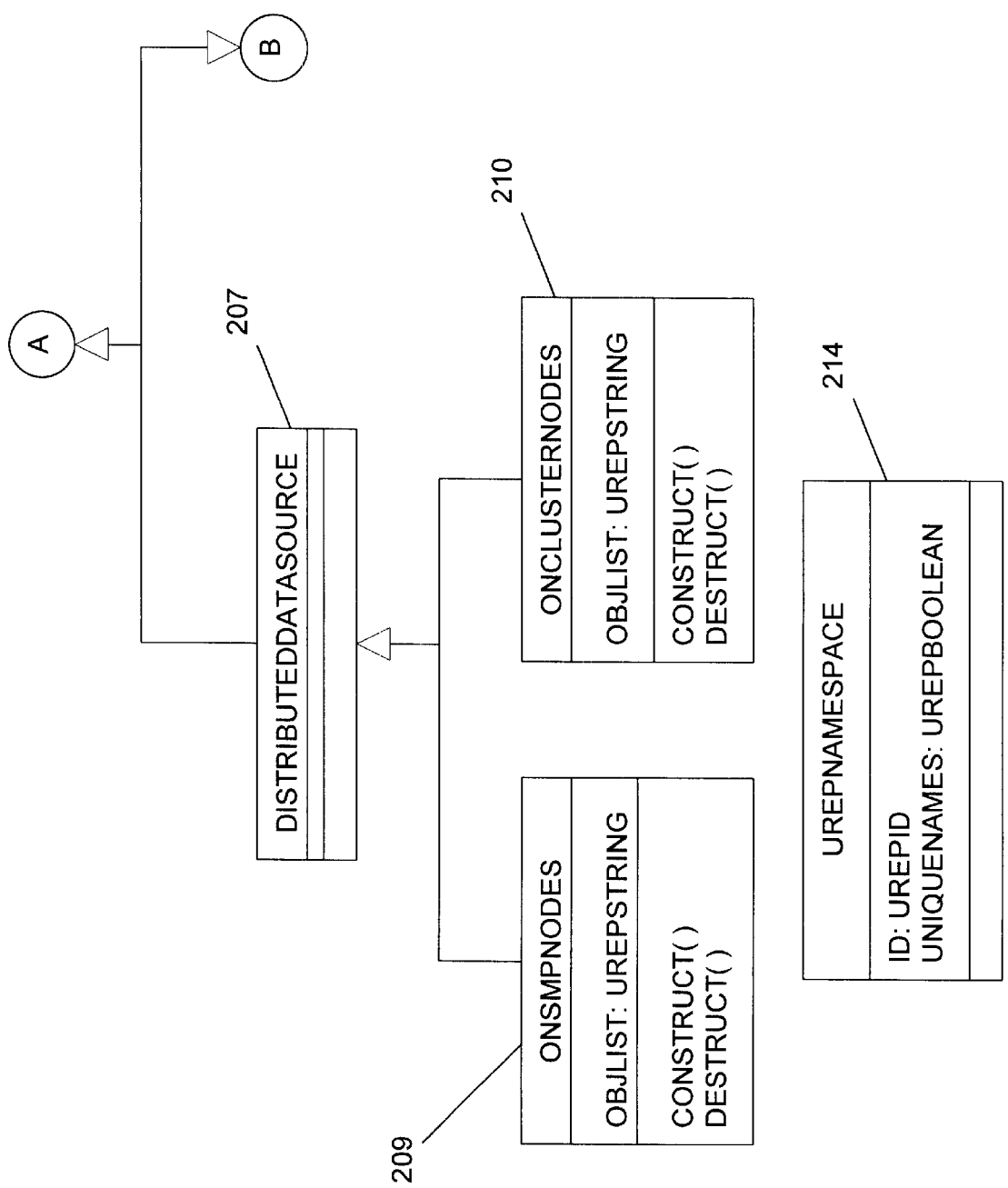
Figure 10:
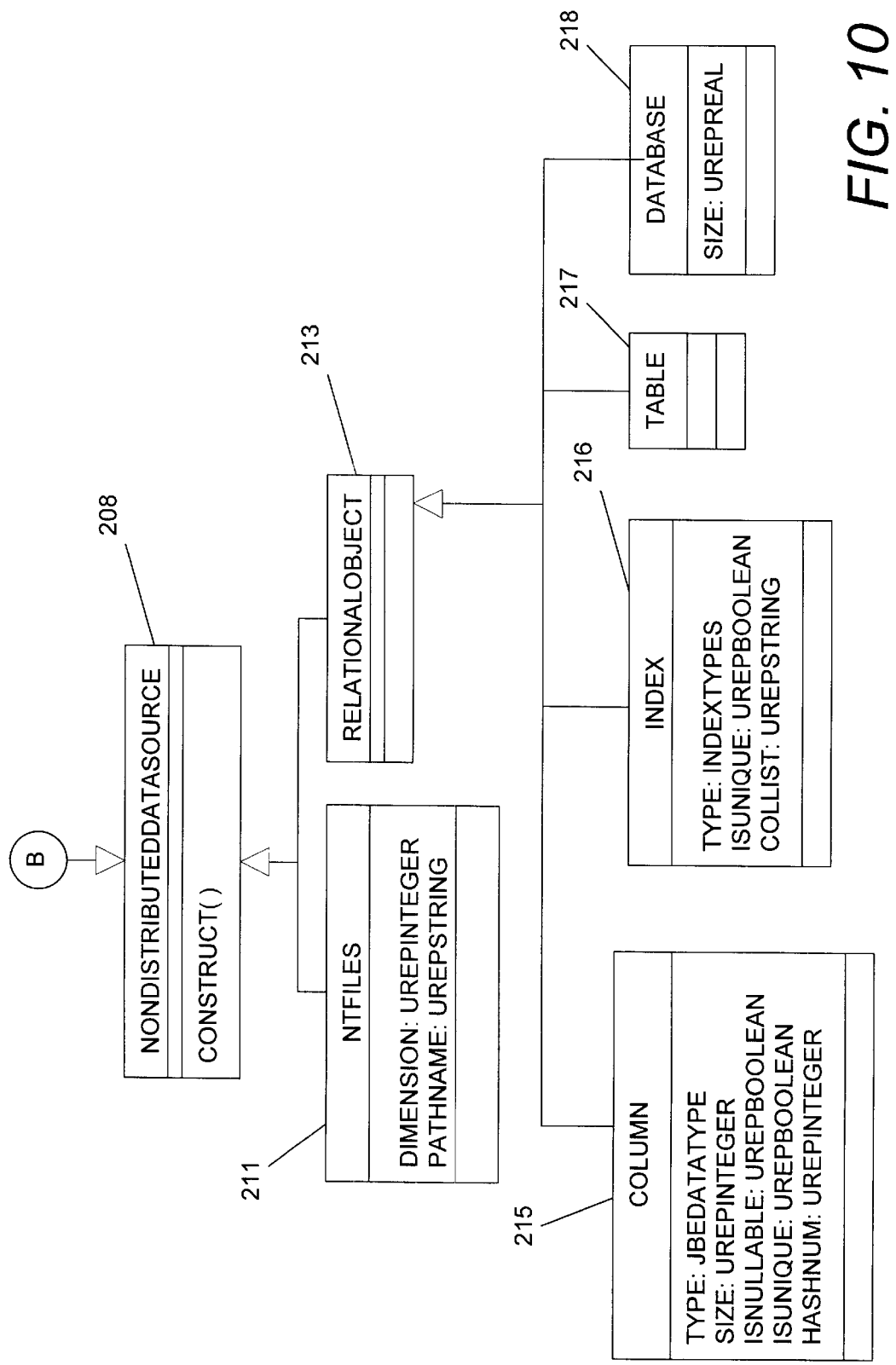

FIGS. 8–10 comprise an inheritance diagram further illustrating organization of the metadata according to the embodiment under discussion. The box labeled "UREP Named Version Object" 201 represents the highest level of abstraction in the UREP and comprises a collection of data objects. The diagram of FIG. 8 illustrates the basic concept that each data object contains embedded data and methods (operations) applied against the data where the data further consists of attributes and types.

FIG. 8 illustrates a second level of abstraction 212, which includes derived classes identified as System Node 202, System Server 203, Data Source Object 204, Field Desc 205 and System Script 206. Thus, each data object has associated therewith information as to the system node(s) where it resides, the system servers within a node which access it, its attribute as being distributed or nondistributed, the field descriptors for NT files and the methods associated with it.

The System Node class 202 includes information sufficient to describe each node in a cluster including attributes such as the Node Address which may, for example, represent an internet port sufficient to locate a node in question. The class 202 further includes construct( ) and destruct( ) methods to create or destroy a node.

The System Server class 203 includes all attributes and parameters regarding each server which resides on a node, where the "server" comprises the messenger, agent and assistant agent codes, i.e., everything necessary to receive a script and to execute it. The server attribute illustrated in FIG. 8 is the server port, which is the address (node and port) at which incoming messages are "listened for" by the messenger of the server in question.

The Data Source Object 204 comprises the names used for various objects in the script. The attribute "DSC category" indicates whether the particular object is distributed (207) or nondistributed (208). A distributed object 207 further includes subclasses 209, 210 as to the type of distribution, i.e., across SMP control units or across nodes of a cluster. The "ObjList" attribute gives a list of the databases contained within the distributed data source name. In other words, the object name is broken down into sub-names which exist on the different nodes.

Non Distributed Data Sources 208 typically are either NT files 211 or a relational database object 213, which further break down into column, index, table and size schema 215, 216, 217, 218 as known to those skilled in the art.

The Script class 206 contains the location of any otherwise unrecognized programs or methods and could contain programs or methods contained in URL's, in CORBA ORB environments, OPEN/OLTP environments, as well as in local or remote NT executables or other script files.

Thus, a system Node contains one or more servers, each of which hosts its own set of Data Source Objects. The relationships represented in FIG. 5 and contained in the metadata indicate what Data Source Objects are related to which servers and thus supply the information necessary to create the local data source descriptor files at run-time.

The information represented by FIGS. 8–10 is preferably captured at system set-up using a graphical interface under control of a system administrator with as much automation as possible in order to avoid unnecessary data entry. For example, such an interface provides automatic scanning of the rows and columns of a relational database. Once set up, the system runs applications automatically as illustrated herein.

The metadata may also include the location of otherwise unrecognized services, the API's (application programming interfaces) or protocols to be used in invoking services (effectively wrapping the "foreign" services). Services may also be sought in trading (OMG, ODP, etc.) networks, allowing a broad heterogeneity of service access, execution and creation. In this way, services invoked as a simple JAVA method may actually have been provided in Open/OLTP, CORBA objects, Microsoft DCOM/COM+, Sun EJB, Linc, MAPPER, . . . , or other environments. In this respect, an infrastructure is provided akin to a parallel nervous system for the invocation and integration of heterogeneous services (invoked as JAVA methods). A system according to the preferred embodiment can span platforms, OS's, and architectures without a requirement for changes in the underlying OS.

Figure 11:
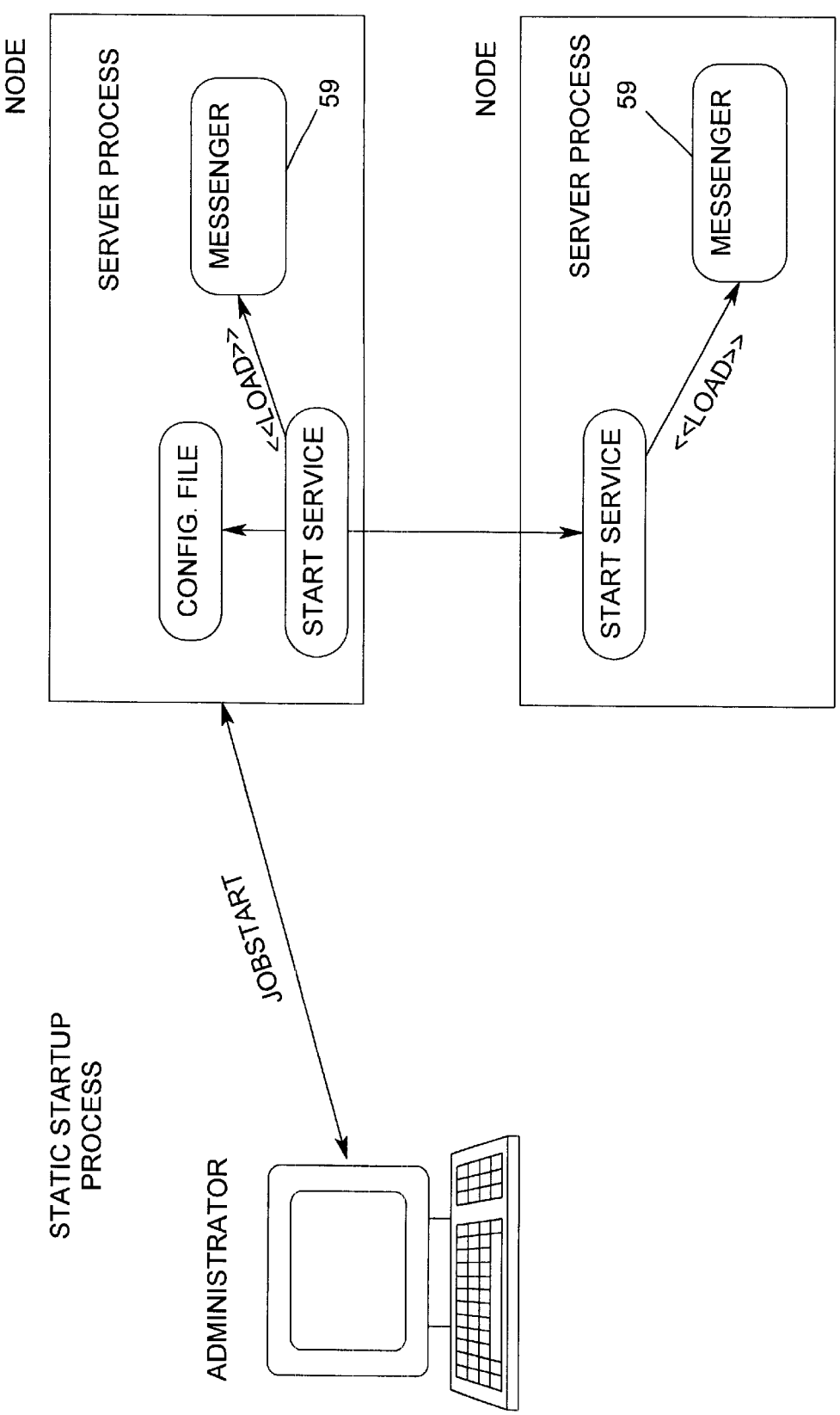
FIG. 11 is a schematic block diagram illustrating a node employing a static start-up process.

In an implementation according to FIG. 11, servers implementing the preferred embodiment run on all the nodes of a system which may be, for example, a cluster, a Uniysis cellular multiprocessing system (CMP), a network, or an CMP (symmetrical multiprocessor). The servers are preferably started by executing a program, "jobstart," from any node in the system. "Jobstart" calls an NT service, registered as "Start Service" automatically at "boot" time on each of the systems nodes, defined in a configuration file. The "Start Service" serves as a listener on the host node in question, performing the loading and invocation of the local runtime processes comprising the messenger and agent. Multiple processes may be activated, automatically, in the same node depending on performance considerations. As soon as the servers have been activated, the runtime process is ready to accept client requests.

Figure 12:
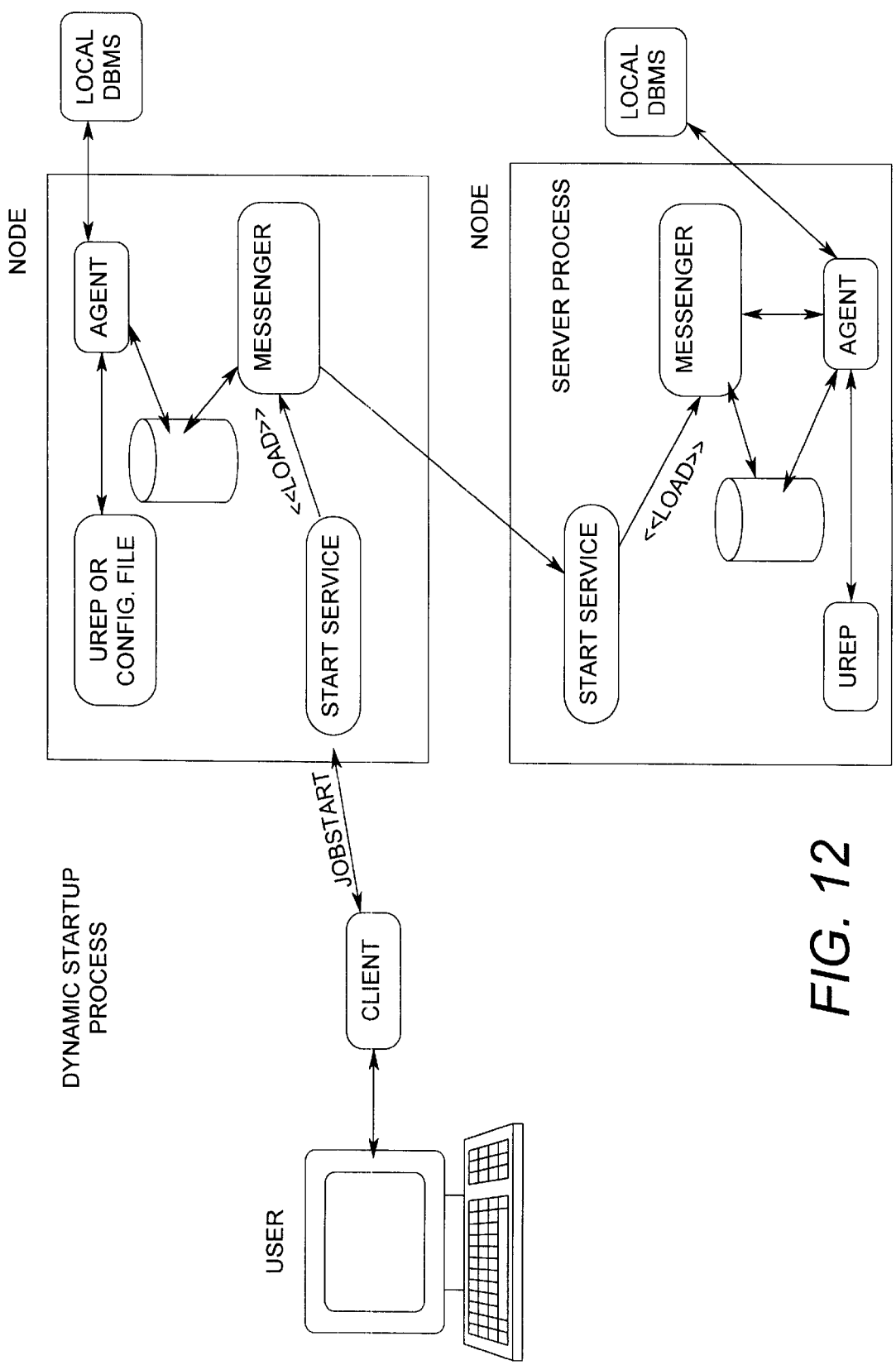
FIG. 12 is a schematic block diagram illustrating a node employing a dynamic start-up process.

In FIG. 12, the configuration of FIG. 11 is shown supplemented by a repository (UREP). Instead of a static start-up of all the servers in the system, a dynamic invocation, based on the client (user) request, is now provided. Based on the data source name (data object) supplied in the client request, the server to which the client application is attached, in processing the user request, retrieves from the repository the details of the locations which support the data source. The Agent process interpreting the scripts then dynamically activates only the servers required to support the user's request. The Agent is shown interacting with a DBMS (Database Management System). A hardware component suitable for implementing the system servers in a system like that of FIGS. 4, 12 or 13 is the Aquanta as manufactured by Unisys Corporation, Bluebell, Pa. CMP, in which the servers reside in partitions of the CMP.

The Messenger is loaded and activated by the local NT service (the Start Service) on each node in the system. Initially, the client application, responding to a user's request, establishes a connection, via the WinSock interface, with this process (server). The server (process) acts as a "messenger" between the client and the agent process for the particular user. The "messenger" performs four key functions:

Acts as the "listener" to receive user requests from the client or from an agent on another node.

Sends the results of the request back to the submitter of the request (the client or an agent on another node).

Manages the creation of, and the assignment of tasks to, agent and assistant processes.

Sends and receives messages to and from these agents and assistants, using shared memory.

As noted above, the Agent process accepts and sends messages from and to the request queue, maintained by the messenger. As illustrated above, the key functions performed by the agent are to parse and process each request in the JAVA script, often resulting in operations on named data sources within the system which may be heterogeneous (e.g., in NT files, SQL Server, Oracle, . . . ) and distributed. In so doing, the agent looks up the descriptor of the data source. If the data is distributed across multiple nodes, the agent rewrites the script as multiple scripts. Each of the latter scripts consists of the operations, for a particular node specified in the descriptor, to be performed on the data sets residing in that node. These scripts are then sent to the "assistant" processes on these other nodes in accordance with the "function shipping" model. The system will typically be configured to run with an initial number of agent processes, with a maximum also specified.

In FIGS. 11 and 12 "node" is used to describe the physical hardware, e.g., an Aquanta server (as in a "node on the network" or a "node of a cluster") or a partition of a CMP. A server is the "apparatus" residing on that node comprising the messenger, agent and assistant code modules. Multiple servers may reside on a single node. The servers may be viewed as comprising part of a "federation." A federation is a group of servers which have access to the same data, objects and scripts. There may be more than one federation in a system.

Figure 14:
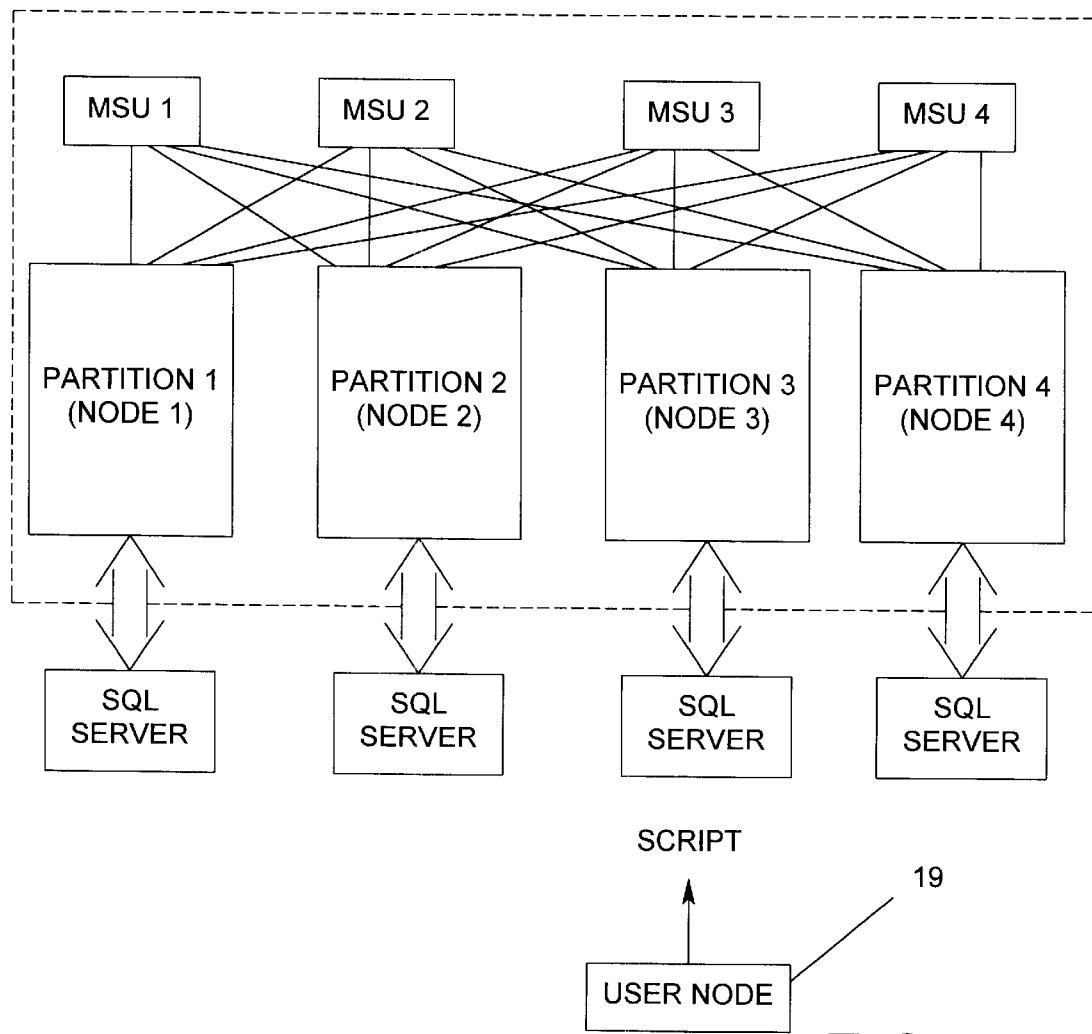
FIGS. 14 and 15 illustrate alternate embodiments of the inventions.

FIG. 14 illustrates an SQL server based instance of the architecture. The Instances of SQL Server are combined into a giant SQL server (a "Cellular SQL Server"). The Cellular SQL Server provides ultra high performance across instances of SQL Server on the SMP nodes of a CMP, cluster or network. The virtual system becomes a giant SQL server. An advantage of the architecture is that Window 2000 and SQL Server do not need to scale above the largest SMP used in a node or partition. In the system of FIG. 14, as well as FIG. 15 parallel services are invoked transparently as Java methods so that one has transparent parallel data access and execution of methods across data distributed on the nodes of the server. Great ease of use results in that the user need only need know Visual Basic and Java or Java and Java Studio.

Figure 15:
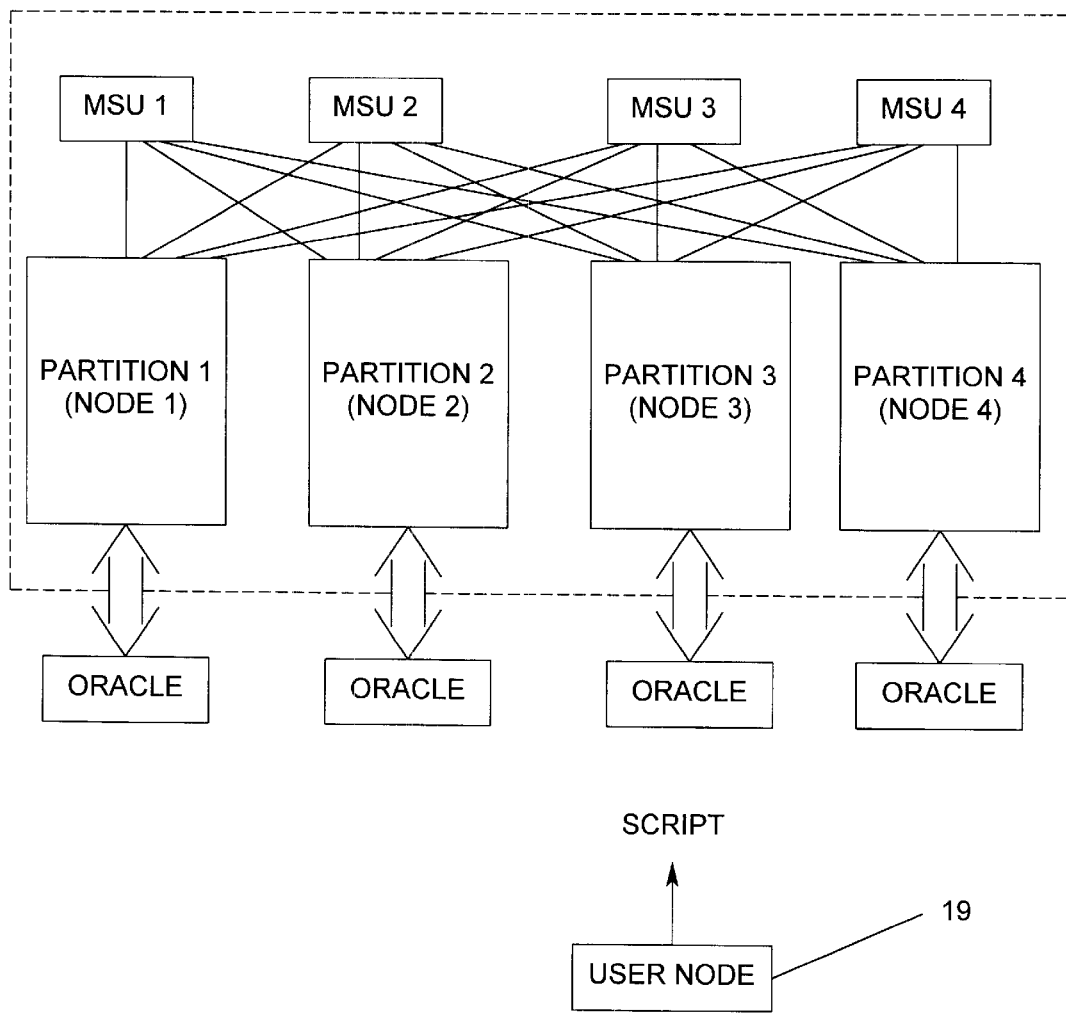

FIG. 15 illustrates an Oracle-based instance of the architecture. Instances of Oracle are combined into a giant Oracle server (a "Cellular Oracle Srver"). The cellular Oracle Server provides ultra high performance across instances of Oracle on the SMP nodes of a CMP, cluster or network. The virtual system becomes a giant Oracle server. Again, Windows 2000 and Oracle need not scale above the largest SNIP used in a node or partition. Parallel services are again invoked transparently as Java methods—so that one has transparent parallel data access and execution of methods across data distributed on the nodes of the server.

According to the preferred embodiment, a set of methods performed by the Agent is provided as shown in the following table:

TABLE I

SYSTEM METHODS

|    | SQL Server | NT File | ORACLE | MNT | CLUSTER | TEMP |
|----|-----------|---------|--------|-----|---------|------|
| 1  | info      | info    | info   | info | info   | Info |
| 2  | format    | format  | format | format | format | Format |
| 3  | groupby   | groupby | groupby | groupby | groupby | Groupby |
| 4  | compute   | compute | compute | compute | compute | Compute |
| 5  | search    | search  | search | search | search | search |
| 6  | sort      | sort    | sort   | sort | sort   | sort |
| 7  | load      | load    | load   | load | load   | load |
| 8  | copy      | copy    | copy   | copy | copy   | copy |
| 9  | extract   | extract | extract | extract | extract | extract |
| 10 | remove    | remove  | remove | remove | remove | remove |
| 11 | modify    | modify  | modify | modify | modify | modify |
| 12 | join      | join    | join   | join | join   | join |
| 13 | mpl       | mpl     | mpl    | mpl | mpl    | mpl |
| 14 | size      | size    | size   | size | size   | size |

The provision of such a set of key methods (the basic components of every application) greatly enhances the ease of application development. Additional methods employed are reflected in the following Table II. In addition, of course, user-written methods may be invoked.

TABLE II

|    | SQL Server | NT File | ORACLE | MNT | CLUSTER | TEMP |
|----|-----------|---------|--------|-----|---------|------|
| 1  | adon      | adon    | Adon   | adon | adon   | adon |
| 2  | adto      | adto    | Adto   | adto | adto   | adto |
| 3  | find      | find    | Find   | find | find   | find |
| 4  | update    | update  | Update | update | update | update |
| 5  | first     | first   | First  | first | first  | first |
| 6  |           | mail    |        |     |         | mail |
| 7  |           | print   |        |     |         | print |
| 8  |           | save    |        |     |         | save |
| 9  |           | saveObject |     |     |         | saveObject |
| 10 |           | SaveScript |     |     |         | SaveScript |
| 11 |           | read    |        |     |         | read |
| 12 |           | write   |        |     |         | write |
| 13 |           | close   |        |     |         | close |
| 14 |           | index   |        |     |         | index |

Further, according to the preferred embodiment, the following logic, controls, environmental variables and commands are provided:

TABLE III

SYSTEM COMMANDS

| Logic | control | environment | commands |
|-------|---------|-------------|----------|
| if    | import  | time$       | sleep () |
| else  | local   | date$       | close () |
| while | main    | day$        | write () |
| try   | private | mon$        | system () |
| catch |         | year$       | format () |
| continue |      | wday$       | audio () |
| break |         | mday$       | debug () |
| dir$  | mpl ()  |             |          |
|       |         |             | trace () |

Further discussion of exemplary implementation of various controls, commands and methods will further illustrate the utility, structure and operation, and advantages of the preferred embodiment.

IMPORT: control

The import control is used to identify a data object from the repository. The object name following the import statement is a unique name in the system. As noted, the different data sources processed according to the preferred embodiment are SQL server, Oracle, NT files, and Multiply NT files. The data object may, of course, include other data sources.

The import statement makes available to the script interpreter (agent) all the metadata files describing the contents of the selected data object. The first occurrence of "import" causes the appropriate data source descriptor file to be set up at each node of the system. Each such descriptor file containing the metadata corresponding to the data source object in the user written script. The API required to access the data is also determined within this statement. The developer never has to be concerned about the type of data, whether the data is local, clustered, or even if the data is moved or columns modified. Because the script is interpreted at run time, all current column sizes, data location, API types, whether to use parallel methods and etc. are all handled dynamically.

EXAMPLE

```
#import      Personnel
main ()      {
   Personnel.sort ( birthday ) ;
} / /main
```

In the above example, . . .

LOCAL: control

This control is used to identify a temporary data object or record set. The object name following the local statement will be a unique name for this script. The different temporary data sources which can be processed are SQL server, Oracle, NT files, clustered data sources and multiple NT files.

The LOCAL statement makes all connections required for this data object. It is possible for a data object to consist of Oracle and SQL server or any other data source. If there are multiple data sources, all connections are handled by this statement. The API required to access the data is also determined within this statement. The developer never has to be concerned about the type of data, whether the data is local, clustered, or even if the data is moved or columns modified. Because the script is interpreted at run time all current column sizes, data location, API types whether to use parallel methods, etc., are all handled dynamically.

EXAMPLE

```
#import      Person
#local  recset   Result = new Person;
#local  recset   Rslt2 = {Person.first_name  Person.last_name}
#local  nt   picture = @data/bitmaps/picture.bmp{ }
#local  ms   table = data_source:tablename{l_name character(10)
f_name character (15) ssn character(9)}
   main () {
     Result.load(Person);
     Rslt2.load(Result);
   } / /main
```

DATA OBJECT IDENTIFIERS:

The following data object identifiers are used on the local control. This allows the interpreter to know which API to use to reference the data object.

| IDENTIFIER | DATA API |
|---|---|
| MS | Microsoft SQL Server |
| ORA | Oracle |
| NT | NT Files |
| RECSET | Temporary Table |

SCRIPT VARIABLE TYPES

The following script variable types are supported:

CHAR
INTEGER
SHORT
LONG
FLOAT
REAL
DOUBLE
DECIMAL
NUMERIC
BYTE
STRING
RECORD
DATE
TIME
TIMESTAMP

SQL DATA TYPES:

The following SQL data types in record databases are supported:

| SQL_type | Size | Data Type |
|---|---|---|
| SQL_CHAR | 1 | char |
| SQL_VARCHAR | 1 | char |
| SQL_BIT | 1 | char |
| ;SQL_TINYINT | 4 | long |
| SQL_SMALLINT | 4 | long |
| SQL_INTEGER | 4 | long |
| SQL_BITINT | 4 | long |
| SQL_REAL | 8 | double |
| SQL_FLOAT | 8 | double |
| SQL_DECIMAL | 8 | double |
| SQL_NUMERIC | 8 | double |
| SQL_DOUBLE | 8 | double |
| SQL_DATE | 6 | DATE_STRUCT |
| SQL_TIME | 6 | TIME_STRUCT |
| SQL_TIMESTAMP | 16 | TIMESTAMP_STRUCT |

PRIVATE: control

This control identifies and creates a variable for this script.

Here are some samples:

| private | int | aa; |
| private | long | aa; |
| private | short | aa; |
| private | int | aa,bb: |
| private | int | aa = 10, bb = 20; |
| private | string | strg; |
| private | char | chr; |
| private | char[20] | buf; |
| private | char | buf [201] = "a b c d e f g"; |
| private | double | dbl = 10.25; |
| private | float | flt = 10.25; |

-continued

| private | record | rec = new data_object |

ENVIRONMENTAL VARIABLES

The system environmental variables can be used in the script just as any other string variable. There are also additional string variables and two reserved words, they are listed below:

| time$ | // | current time |
| date$ | // | current date |
| day$ | // | current day |
| mon$ | // | current month |
| year$ | // | current year |
| wday$ | // | current week day |
| mday$ | // | current month day |
| dir$ | // | base director for this federation |
| Reserved words: | | |
| TRUE | // | A non zero value |
| FALSE | // | A zero value |

TRACE: control

This control will activate the trace code to aid in the debug of a script. It will write script logic records to the script trace file as they are processed. The write command will also write data to the same trace file. The greater the number, the more information dumped to the trace file. It is presently preferred to either use a two or three only.

An example of the "trace" control is:

```
#trace     2      //dump script record to trace file
                  //before it is executed
#import           Personnel
main() {
  Personnel.search(
      if     (birthday = = "06/14/45");
  );
  write("Search complete");
  close().mail(Charles.Hanson@unisys.com, "trace");
} //main
```

NOTE: The code in the "box" above identifies embedded script code. The embedded script code is contained as a parameter within the relevant method and will be interpreted as part of the definition of what the particular method should perform.

FORMAT( ): function

This function is used to create a character string from multiple arguments. The syntax and rules of sprintf apply.

An example of the 'format' function is:

```
private     char       buf[20];
private     int        cnt = 25;
private     char [20]  name = "total";
main()   }
   buf = format ("%s count =%d",name,cnt);
} //main
```

UPPER( ): function

This function is used to convert the argument character string to upper case characters. It does not change the argument variable.

An example of the 'upper' function is:

```
private     char       buf[20];
private     char[20]   name = "abcdef";
main() {
   buf = upper( name);
} //main
```

LOWER( ): function

This function is used to convert the argument character string to lower case characters. It does not change the argument variable.

An example of the 'lower' function is:

```
private     char      buf[20];
private     string    name = "ABCDEFGH";
main() {
   buf = lower( name);
} //main
```

STRIP( ): function

This function is used to strip off all leading and trailing spaces in the argument character string. It does not change the argument variable.

An example is:

```
private     char       buf[20];
private     char[20]   name = "  abcdef  ";
main() {
   buf = strip( name);
} //main
```

CENTER( ): function

This function is used to center the character string in the argument. It does not change the variable and the variable must be a character type of fixed length.

An example of the 'center' function is:

```
private     char       buf[20];
private     char[20]   name = "abcdef";
main() {
   buf = center( name);
} //main
```

LEFT( ): function

This function is used to left justify the character string in the argument. It does not change the variable and the variable must be a character type of fixed length.

An example is:

```
private     char       buf[20];
private     char[20]   name = " abcdef";
main( ) {
   buf = left(name);
} // main
```

RIGHT( ): function

This function is used to right justify the character string in the argument. It does not change the variable and the variable must be a character type of fixed length.

An example of the 'right' function is:

```
private         char        buf[20];
private         char[20]    name = "abcdef";
main( ) {
    buf = right(name);
} //main
```

FOR( ): function
This function is the same as the 'for' function in JAVA.
An example of the 'for' function is:

```
private         int         a;
main( ) {
    for( a=0; a < 10; ++a) {
        // do some ogic
    };
} // main
```

WHILE( ): function
This function is the same as the 'while' function in JAVA.
An example of the 'while' function is:

```
private         int         a = 0;
main( ) {
    while(a++ < 10)) {
        // do some logic
    } //while
} // main
```

BREAK( ): function
This function is the same as the 'break' function in JAVA.
An example of the 'break' function is:

```
private         int         a;
main( ) {
    for( a=0; a < 10; ++a) {
        if (a == 5) {
            break
        }
        // do some logic
    } // for
} // main
```

CONTINUE( ): function
This function is the same as the 'continue' function in JAVA.
An example of the 'continue' function is:

```
private         int         a;
main( ) {
    for( a=0; a < 10; ++a) {
        if (a == 8) {
            a = 0
            continue
        }
        // do some logic
    } // for
} // main
```

EXIT( ): function
This function is the same as the 'exit' function in JAVA.
An example of the 'exit' function is:

```
main( ) {
    if (more_to_do == FALSE) {
        exit( );
    }
} // main
```

IF( ): function
This function is the same as the 'if' function in JAVA.
An example of the 'if' function is:

```
private         int         a = 0;
main( ) {
    if (a < 10 ) {
        // do some logic
    } else {
        // do some more logic
    }
} // main
```

TRY: function
This function will allow you to watch for application errors and then break out of the code and jump to a catch routine. It is the same as the 'try' function in JAVA.
An example of the 'try' function is:

```
main( ) {
    try {
        // do some logic
    } catch ( ) {
        // do error handling
    }
} // main
```

CATCH: function
This function is for handling error conditions. The argument of the control is ignored currently.
An example of the 'catch' function is:

```
main( ) {
    try {
        // do some logic
    } catch ( ) {
        // do error handling
    }
} // main
```

SWITCH: function
This function allows you to selectively do code depending on the value of a variable. It works in conjunction with case statement. It is the same as the 'switch' function in JAVA.
An example of the 'switch' function is:

```
private int         cnt = 1
main( ) {
    switch (cnt) {
        case 0:
            break;
        case 1:
            break;
        default:
```

```
            break;
        } //switch
    } // main
```

CASE: function

This function allows you to selectively do code when the value of the switch statement object matches the value of the case statement. It works in conjunction with the switch statement. It is the same as the 'case' statement in JAVA.

An example of the 'case' function is:

```
    private int                    cnt = 1
    main( ) {
        switch (cnt) {
            case 0:
                break;
            case 1:
                break;
            default:
                break;
        } //switch
    } // main
```

DEFAULT: function

This function will allow you to identify code as default when there is not a match for the case statement. It works in conjunction with switch and case statements. It is the same as the 'default' statement in JAVA.

An example of the 'default' function is:

```
    private int                    cnt = 1
    main( ) {
        switch (cnt) {
            case 0:
                break;
            case 1:
                break;
            default:
                break;
        } //switch
    } // main
```

SQLINFO: (SQL SERVER) command

This command creates a temporary data object that contains the information included in the data source name and table name referenced in the argument. The information contained in the data resulting file identifies the server where the data object is located, the type of data (SQL SERVER) and its data source name and table name. It also includes all column names, types and sizes. The object created by this command may then be added to the system with the SAVEOBJECT method discussed in further detail below.

The following example illustrates connection to a SQL SERVER data source with the name of "tpcd" to create the metadata for the table "lineitem." This information would then be recorded as a data object ("tpcd1") in the metadata. This is to make it easy to create the metadata corresponding to existing SQL Server and Oracle files.

EXAMPLE

```
    main ( ) {
        sqlinfo ("tpcd:lineitem") .saveobject ("tpcd1");
    } //main
```

ORACLEINFO: (ORACLE) command

This command creates a temporary data object that contains the information included in the data source name and table name specified in the argument. The information contained in the resulting file identifies the server where the data object is located, the type of data (ORACLE) and its data source name and table name. It also includes all column names, types and sizes. The object created by this command could then be added to the system with the saveobject method.

The example connects to an Oracle data source with the name of "tpcd" and creates the metadata for the table "lineitem". This information is then recorded as a data object ("tpcd2") in the metadata.

EXAMPLE

```
    main( ) {
        oracleinfo("tpcd:lineitem).saveobject("tpcd2");
    } //main
```

MAIL: command

This command is used to send e-mail. There are three arguments of which only the first one is required. The first argument is a character string containing the person's e-mail address. The second is the subject and the third argument is the body of the message.

The example below searches the Personnel data object for employees with a birthday today identified by environmental variable date$. It then reads the records and sends an e-mail to each employee with a birthday.

EXAMPLE

```
    #import              Personnel
    private record       rec = new Personnel;
    private char         buf[200];
    private string       bf="hope you have a wonderful day"
        Personnel.search(
            if (birthday == "date$);
        );
        while (rec = this.read( )) {
            buf = format ("Happy birthday %s %s",
                                      rec.first_name,bf);
            mail (rec.email, "birthday greetings",buf);
        } // while
    } // main.
```

WRITE: command

This command is used to aid in the debug of applications. The data specified is written to the trace file of the script. The trace command also writes to this same file.

There are different forms to the arguments.

write("character string only");

write(data_record_object);

The example below will write the character string with the value of cnt to the trace file.

```
private int                    cnt = 25
main() {
write(format("The value of cnt = %d", cnt ))
}//main
```

SLEEP: command

This command will suspend the script for the amount of milliseconds specified in the argument.

The example below will suspend the script for one minute.

EXAMPLE

```
main() {
sleep (60000);
}//main
```

CLOSE: command

This command will close the trace file and make it the current "this" object.

This example creates a trace file and e-mails it to a fictitious programmer.

```
#trace 2
#import                        Personnel
main() {
Personnel.search(
if (birthday == "06/14/55");
);
close();
this.mail("Charles.Hanson@unisvs.com,","ERR");
}//main
```

OBJECTS: command:

This command will create a temporary data object that contains a list of all the data object names in the federation.

The example will display using notepad a list of all data objects in this federation.

```
main() {
objects().display();
}//main
```

FORMAT: command

This command will format a character string. The basic rules of a sprintf command in c++ apply.

The example will write the current date and time.

EXAMPLE

```
#import                        Client
private char                   buf[100];
main() {
buf = format("%s--%s", date$,time$);
Client.write(buf);
}//main
```

MPL: command

This command starts either a named script or a data object, which contains a script, on the server specified by the second argument. If the second argument is omitted then it will start the script on the local server. The new started script runs as an independent script and will not return to the requesting script.

EXAMPLE

```
#local view script={}
main() {
mpl("strip_data" ,4);
script.write("#import Personnel           ");
script.write("main () {                    ");
script.write("Personnel.search(            ");
script.write(" if(state==/"CA/");           ");
script.write("                             ");
script.write("this.format(/"%s,%s/",        ");
script.write("last_name,first_name);       ";
script.write("this.print() ;               ";
script.write("}                            ";
script.close()
mpl(script,5);
}//main
```

EXECUTE: command

This command executes the program of the first argument on the server specified by the second argument. If the second argument is omitted, then it will start the executable program on the local server. The executable program runs as an independent program and will not return to the requesting script.

EXAMPLE

```
main() {
execute("xyz.exe" ,4);
execute("xyz.bat" ,5);
}//main
```

AUDIO: command

This command will play the wav file specified by the argument. The wav file must exist in the directory specified for messages.

EXAMPLE

```
main() {
audio("greetings");
}//main
```

WRITE: method

This method is used to send multiple character records to the data object referenced in the script. The method supplies one record at a time.

Client.write("character string only";
Client.write(data_object);

The example below searches the Personnel data object for employees with a birthday on June 14. Notice the wild card character ('ξ') is used to only search part of the column. The result of the search will be reformatted into three columns with commas separating them.

EXAMPLE

```
#import            Personnel
#import            Client
main() {
Personnel.search (
if (birthday == "06/14/ |");
)
this.format("%s,%s,%s",last_name,first_name ssn);
Client.write(this);
}//
```

WRITE: method of temporary data objects

This method is used for constructing reports that one would e-mail, fax, print or send to a bean.

There are different forms to the arguments.

Data_object.write("character string only");

Data_object.write(data_record_object);

The first use of this method in a script creates a new object or erases the existing object if it existed. Every reference after the first adds records to the method's object. Before other methods can reference this new object a 'close' method must be performed on it.

The example below writes two records to the temporary data object called temp and then sends the result to the bean. Notice that the close method is required before the data is sent. The second example below achieves the same results.

EXAMPLE

```
#import            Client
#local             recset temp={}
main() {
temp.write(format(The number of records = %d",
25));
temp.write ("This will be the second record of the data object called
temp")'
temp.close;
Client.write(temp);
}//
```

INFO: method

This method creates a temporary NT file that contains the data definition for the method's object. The information contained in the data definition file identifies the server where the data object is located, the type of data (Oracle, SQL SERVER,NT file) and its table name and data space. It also includes all column names, types and sizes.

EXAMPLE

```
#import            Personnel
main() {
Personnel.info() .display();
}//main
```

FORMAT: method

This method creates a temporary data object by mergfing character strings and data columns from t he data object. The basic rules of a sprintf command in c++ apply. Every record of the method's object is processed.

The example below creates a temporary data object. The record of the new object contains the data from two columns (last_name, first_name) separated with two '—' characters. The temporary data object will have the same number of records as the original data object and is sent to a bean.

EXAMPLE

```
#import            Personnel
#import            Client
main() {
Personnel.format("%s - - %s",
last_name,first_name);
Client.write(this);
}//main.
```

LOAD: method

This method loads the method's object with the data object in its arguments. If the column names of the objects do not match, the columns are left blank. Only the like columns are loaded. If columns are the same type but different lengths they are either truncated or expanded to the size of the receiving column. If the data object already existed all records will be deleted, and the data object will only contain the new records. If the data object did not exist, a new one will be created. If the column types changed from the previous data object, then a remove method must be called before overloading the new object.

EXAMPLE

```
#import            Personnel
#import            Payroll
main() {
Payroll.load(Personnel);
}//mail.
```

SORT: method

This method sorts the method's object by the column(s) in its arguments. If there are multiple columns, the order of the sort is determined by the order of the columns. Descending sort is specified by a "(d)" following the column name. If the arguments contain a numeric value, that value determines the maximum number of records to return.

The example below sorts the Personnel data object on state column (ascending) and the secondary level sort on last_name column in descending order. The numeric "10" specifies to return a maximum of 10 records. A maximum of 10 records containing two columns (state and last_name) will be returned.

EXAMPLE

```
#import          Client
#import          Personnel
#local recset temp={Personnel,state
Personnel.last_name}
main() {
Personnel.sort(state,last_name(d),10);
temp.load(this)
Client.write(temp);
}//main
```

SEARCH: method

This method uses an embedded script within its arguments. The embedded script is interpreted by the method and executed for every record in the method's object. The result of this method is a temporary data object containing all the records that match the search criteria.

The example below searches the Personnel data object and sorts all records where the state column is either "CA" or "MN". The records returned contain two columns (state and last name) that are separated by a comma.

EXAMPLE

```
#import          Client
#import          Personnel
main() {
Personnel.search (
if (state == "CA" || state == "MN");
);
this.sort(last_name);
this.format("%s,%s",state,last_name);
Client.write(this);
}main
```

GROUPBY: method

This method uses an embedded script within its arguments. Before the embedded script is interpreted by the method, the records that satisfy the request are selected and then sorted by the object(s) defined within parenthesis. The embedded script is then performed on the sorted records. Any variable values or objects changed in the embedded script will also be changed in the main script. The example below processes two states from the Personnel data object and then groups by state and returns two records containing the state and number of records for that state.

EXAMPLE

```
#import   Client
#import   Personnel
#local    recset      temp={ }
private   int         cnt=0;
main() {
Personnel.groupby((state)
if (state == "CA" || state == "MN")
{
if (EQUAL) {
++cnt;
}else{
temp.write(format ("state %s = %d",
Personnel.state,cnt));
cnt =0;
}
```

-continued

```
}
);
Client.write(temp);
}//main
```

EXTRACT: method

This method uses an embedded script within its arguments. The embedded script is interpreted by the method and executed for every record in the method's object. Every record in the database that matches the search criteria will be deleted from the data object, and a temporary object containing the records will be the result of the method.

The example below will search the Personnel data object and return all records that state column is either "CA" or "MN". It also will delete these records from the data object. The records returned contain two columns (state and last_name).

EXAMPLE

```
#import          Client
#import          Personnel
main() {
Personnel.extract(
if (state == "CA" || state == "MN");
);
this.format("%s,%s",state,last_name);
Client.write(this);
}//main
```

SAVEOBJECT: method

This method is used to create a new data object name or to create a data object on another server to allow parallel activity. The data object name identified by the arguments is added to the list of system objects available to all members of the system. Once the object name is added to the system it requires a load or adon method to insert data. The method's object is an NT file identical to the result of the info method.

EXAMPLE

```
#import                             Personnel
main() {
Personnel.info().display().saveobject("objectx");
}//main.
```

MAIL: METHOD

This method is used to send e-mail. The method's object is sent as an attachment. There are three arguments of which only the first one is required. The first argument is a character string containing the person's e-mail address.

The example below searches the Personnel data object for employees with a particular birthdate. It then reads all records and sends e-mail to each employee with a birthday.

EXAMPLE

```
#import          Personnel
#import          Birthdaycard
private          record rec = new Personnel;
private          char buf[200];
private string bf="hope you have a wonderful day";
main() {
Personnel.search(
if (birthdate == date$);
);
while(rec = this.read()) {
buf = format("Happy birthday %s %s",
rec.first_name,bf);
Birthdaycard.mail(rec.email,
"birthday greetings",buf);
}//while
}//main
```

STATUS: method

This method is used to send single record character strings. There are different forms to the arguments.

Client.status("character string only");

Client.status(data_object);

The example below will send a character string, "We are performing your request".

EXAMPLE

```
#import          Client
main() {
Client.status("We are performing your request");
}//main
```

READ: method

This method suspends the script and waits until it receives an input. The method loads the variable(s) in the arguments with the input. If there are multiple variables, then a comma in the input string will separate the data, and the variables will get loaded in order.

The example below will take a character string and parse it. The first part, until a comma is encountered, will be loaded into the bdate variable and the data following the comma will be interpreted as a number and loaded into the e_sal variable.

EXAMPLE

```
#import          Personnel
#import          Client
private          char bdate[20];
private          int e_sal;
main() {
Client.read(bdate,e_sal);
Personnel.search(
if (birthday >bdate &&salary>e_sal);
)
this.format("%s,%s,%s",last_name,first_name,ssn);
Client.write(this);
}//main
```

SIZE: method

This method returns the number of records in the method's object.

The example below will get the number of records from Personnel data object and return the value.

EXAMPLE

```
#import          Client
#import          Personnel
private          int records=);
main() {
records = Personnel.size()
Client.write(format ("The number of records in
Personnel =%d",records));
}//main
```

DISPLAY: method

This method displays records in a notepad window. Its purpose is to help in the debug of a script.

The example below will open a notepad window with five records from Personnel data object.

EXAMPLE

```
#import          Personnel
main() {
Personnel.display( 5 );
}//main
```

COPY: method

This method loads the method's object into the data object in its arguments. If the column names of the objects don't match the columns are left blank. Only the like columns are loaded. If columns are of the same type but different lengths, they will either be truncated or expanded to the size of the receiving column. If the method's object did not exist, it will be created. If the column types changed from the previous data object, then a remove method must be called before overloading the new object.

EXAMPLE

```
#import          Personnel
#import          Payroll
main() {
Personnel.copy(Payroll);
}//main
```

ADTO: method

This method adds the method's object to the data object in its arguments. If the column names of the objects don't match the columns are left blank. Only the like columns are added. If the columns are of the same type but different lengths, they will either be truncated or expanded to the size of the receiving column.

EXAMPLE

```
#import          Personnel
#import          Payroll
main() {
```

-continued

```
Personnel.adto (Payroll);
}//main
```

ADON: method

This method adds the data object in its arguments to the method's object. If the column names of the objects don't match, the columns are left blank. Only the like columns are added if the columns are of the same type, but different lengths, they will either be truncated or expanded to the size of the receiving column.

EXAMPLE

```
#import      Personnel
#import      Payroll
main() {
Personnel.adon (Payroll);
}//main
```

REMOVE: method

This method removes the method's object from the system.

EXAMPLE

```
#import      Payroll
main() {
Personnel.remove ();
}//main
```

MODIFY: method

This method uses an embedded script within its arguments. The embedded script is interpreted by the method and executed for every record in the method's object. This method updates every record in the method's object that match the search criteria. Any variable values changed in the embedded script are also changed in the main script.

The example below will add 10% to the salary column of the Personnel data object where the state column is either "CA" or "MN".

EXAMPLE

```
#import      Payroll
main() {
Personnel.modify (;
if (state == "CA" || state == "MN") {
salary += (salary * .10);
}
);
}//main
```

FIND: method

This method uses an embedded script within its arguments. The embedded script is interpreted by the method and executed on every record until it finds a record in the method's object that match the search criteria. The method then inserts the record into a record variable for the main script to process.

The example below will find a record in the Personnel data object that match the search criteria and return it into the rec variable.

EXAMPLE

```
#import           Personnel
private           record rec= new Personnel'
main() {
rec = personnel.find (
if (ssn == "476504118")
);
}//main
```

FINDLOCK: method

This method uses an embedded script within its arguments. The embedded script is interpreted by the method and executed on every record until it finds a record in the method's object that match the search criteria. The method then will lock and insert the record into a record variable for the main script to process.

The example below will find a record in the Personnel data object that matches the search criteria and then lock it. If the lock is available, it will load the rec variable with the record. If the lock is not available, it will throw an exception.

EXAMPLE

```
#import           Personnel
private           record rec=new Personnel'
main() {
while(FALSE == (rec = personnel.findlock (
if (ssn == "476504118")
))) {
sleep(1000);
}//while
}//main
```

UPDATE: method

This method must be preceded by a findlock method in the same script as the method's object. The record object in the arguments is updated back into the same record found in the preceding findlock.

The example below will find a record in the Personnel data object that matches the search criteria and return it into the rec variable. The phone column is changed and then the record is returned to the method's object.

EXAMPLE

```
#import           Personnel
private           record rec = new Personnel;
main() {
rec = Personnel.findlock (
if (ssn == "476504118")
);
rec.phone - "425-881-5039";
Personnel .update(rec);
}//main
```

COMPUTE: method

This method uses an embedded script within its arguments. The embedded script is interpreted by the method and executed for every record in the method's object. Any variable values or objects changed in the embedded script are also changed in the main script.

The example below will only process two states from the Personnel data object and then group by state and return records containing the state and last name and first name.

EXAMPLE

```
#import          Client
#import          Personnel
#local           recset temp = { }
#local           recset temp2 = { }
main () {
Personnel .compute(
if (state == "CA" || state == "MN") {
if (state == "CA") {
temp.write(format("California %s %s",
Personnel.last_name, Personnel.first_name) );
} else {
temp2.write(format("Minnesota %s %s",
Personnel.last_name, Personnel.first_name));
}
}
}
);
temp.adon(temp2);
Client.write(temp);
}//main
```

JOIN: method

This method creates a view of the data defined by the group of columns defined in the first set of parenthesis and then merges the columns from the two records whenever the "if" part of the argument is true.

The example below will create a temp data object that contains three columns (last_name, first_name and city). The temp data object is then returned.

EXAMPLE

```
#import          Client
#import          Personnel
#import          Zipcodes
main () {
Personnel.join (
(last_name,first_name,Zipcodes.city)
if (zip == Zipcodes.zip );
);
Client.write(this);
}//main
```

MPL: method (Multiple Points of Logic):

This command starts either a named script or a data object, which contains a script. If the method's object is a clustered object, then the script will be started on each server with "this" set to the data object that resides on that server. If the method's object is not a cluster, then the script will be started on the same server or on a server specified by a second argument with "this" set to the method's object. When the scripts are completed the 'THIS' object from each server is returned and merged into a new 'THIS' result.

EXAMPLE

```
#import          Personnel
#import          Client
main() {
Personnel.mpl("strip_data");
Client.write(this);
}//main
```

SAVESCRIPT: method

This method is used to add the method's object (which is the script) and the script name identified by the arguments to the list of federation scripts available to all members of the federation. After the script is added to the federation list of scripts, that script can be used as a script or as a method that applies to all data objects.

EXAMPLE

```
#local          nt          script=@scripts/example{ }
main() {
script.display();
script.savescript("scripta");
}//main
```

PRINT: method

This method is used to send the method's object to a printer. If no arguments are supplied, the default printer is identified in the config file for this server. The example below searches the Personnel data object for employees with a birthday this month. It will format the records and then print.

EXAMPLE

```
#import          Personnel
main() {
Personnel.search (
if (birthmonth == mon$)
);
this.format("%s %s" ,first_name,last)_name);
this.print();
}//main
```

THIS: method

This method identifies the method's object as the current "THIS" object.

EXAMPLE

```
#import          Payroll
main() {
Payroll.this();
this.info() .display ();
}//main
```

READ: method

This method reads a record from the method's object and inserts it into a record variable. A FALSE condition is returned when there are no more records.

EXAMPLE

```
#import          Personnel
#local           recset tmp-{ }
private record   rec = new Personnel;
main() {
while (rec = Personnel.read() ) {
tmp.write(format("%s %s", rec.last_name,
rec.first_name) );
}//while
tmp.close() .display()
}//main
```

COLUMNS: command

This command creates a temporary data object that contains a list of all the columns of the data object.

The example will display using notepad a list of all columns in the data object.

EXAMPLE

```
#import Personnel
main() {
Personnel.columns() .display();
}//main
```

METHODS: command

This command creates a temporary data object that contains a list of all the columns of the data object.

The example will display using notepad a list of all columns in the data object.

EXAMPLE

```
#import Personnel
main() {
Personnel.methods() .display();
}//main
```

The following code indicates how easily the system according to the preferred embodiment allows new functions to be invoked. In this case, a database, nt_data, is being searched for a particular State, and the results are being e-mailed (via Exchange) to the indicated address.

EXAMPLE

```
#import nt_data
main () {
nt_data.search (if (state == "CA")).mail
("Bob.Hail@unisys.com")
}
```

As another example, one may search a database, containing the population of the United States, for persons with particular attributes, sort the results of the search, and fax the results of the sort—in one easy statement. If the database containing the population of the United State s is distributed, the search and sort will be run automatically in parallel.

In installing the apparatus according to the preferred embodiment, one first defines a number of environmental variables. The value of FED_federation number points to the "trader" for the federation. The trader contains a map network drive or network share. The drive contains the scripts, data object definition files errors and other messages for this federation. It also contains a file which identifies the servers in the federation. The latter is called the Federation file. In the preferred embodiment for the CMP, a copy of the "trader" information will reside in shared memory.

This and the following information is contained in a repository (acting as a "trader"). In the preferred CMP embodiment, a copy of the "trader" information resides in shared memory. The system administrator is guided, using a graphical user interface, through the specification of this configuration information. A repository application copies the information to the indicated local files (local to each server), a copy of which, in the preferred CMP embodiment, optionally resides in the dedicated memory of the partitions containing the servers.

The value, FED_federation number.server number, identifies a base directory for the server "server number" within the federation "federation number". The apparatus uses the base directory for temporary files, scripts, data objects and NT files. The value of environmental variable, _PATH, provides the location of the apparatus executable.

The following illustrates a typical federation file, listing the servers within the federation. (This file is contained within the "trader", pointed to by FED_federation number.):

Federation Name=1
Server=10 "server name 10"
Server=1 "server name 1"
Server=2 "cluster 2"
Server=3 "server name 3"
Server=4 "server name 4"
Server=5 "server name 5"

The following illustrates a typical server configuration file, contained within the base directory for the server, pointed to by "_FED federation.server."

Typical configuration file
Federation=1
Listen on Port=3200
My server=10
Debug=0
Sound=1
Inp_msg_time=500
Pre_start_processor=1

"Pre_start_processor" indicates the initial number of agent processes in the server. If additional processes are required, they will be generated dynamically. The "Inp.msg.time" parameter is a time out value.

The Debug parameter specifies levels of debugging information to be written to the trace file (the parameter has values from 1 to 10). The Sound parameter indicates whether audio error and other messages should be provided.

When the server is installed, the apparatus copies the federation file, all object definition files, and all scripts from the map network drive or network share (that is, from the "trader") to the local subdirectories on the server. A "start service" is used to start or stop the servers in a federation.

Figure 16:
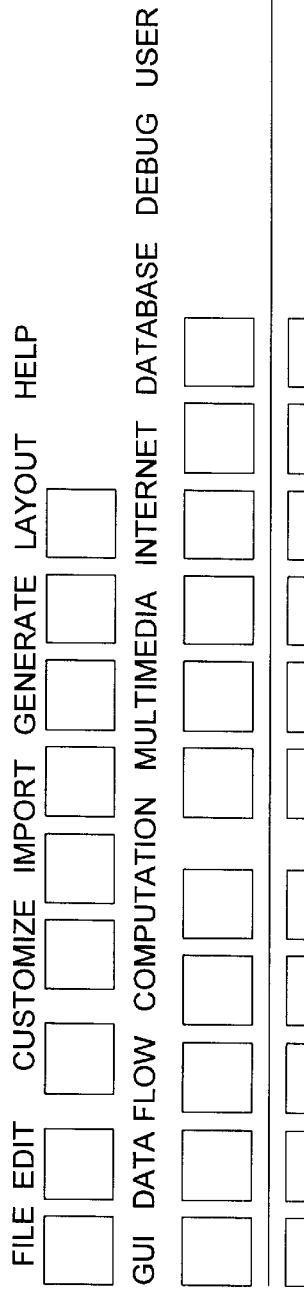
Figure 17:
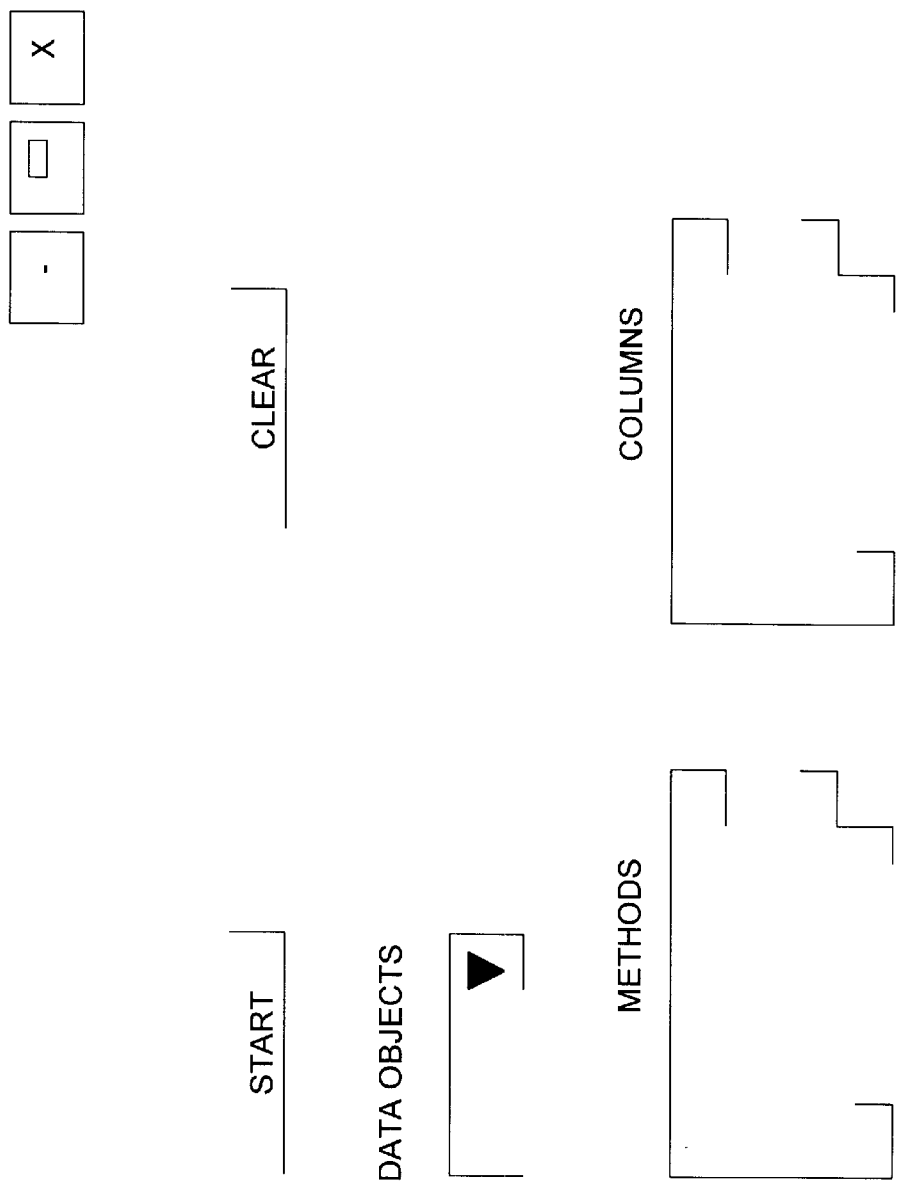
Figure 18:
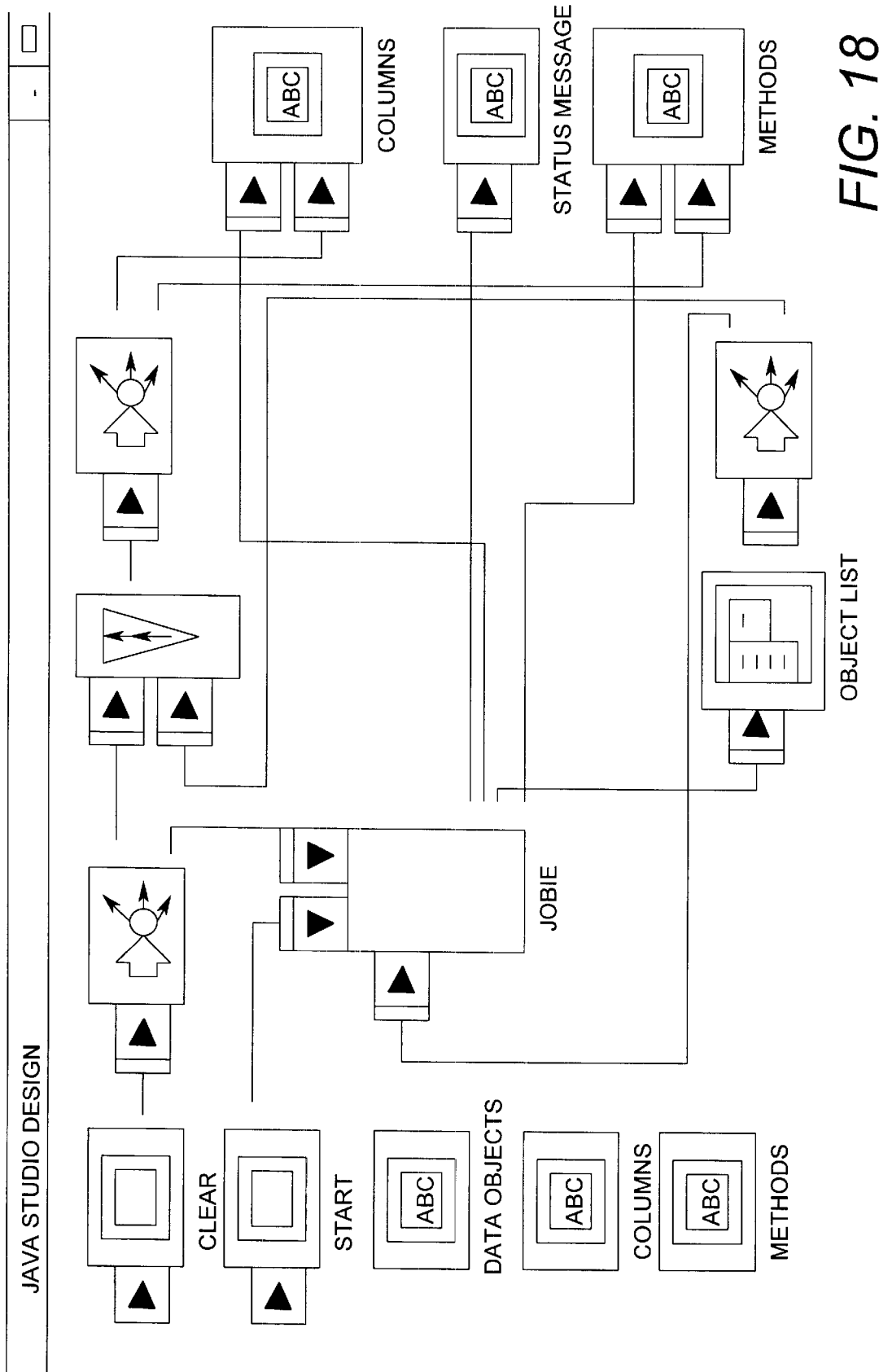
Figure 22:
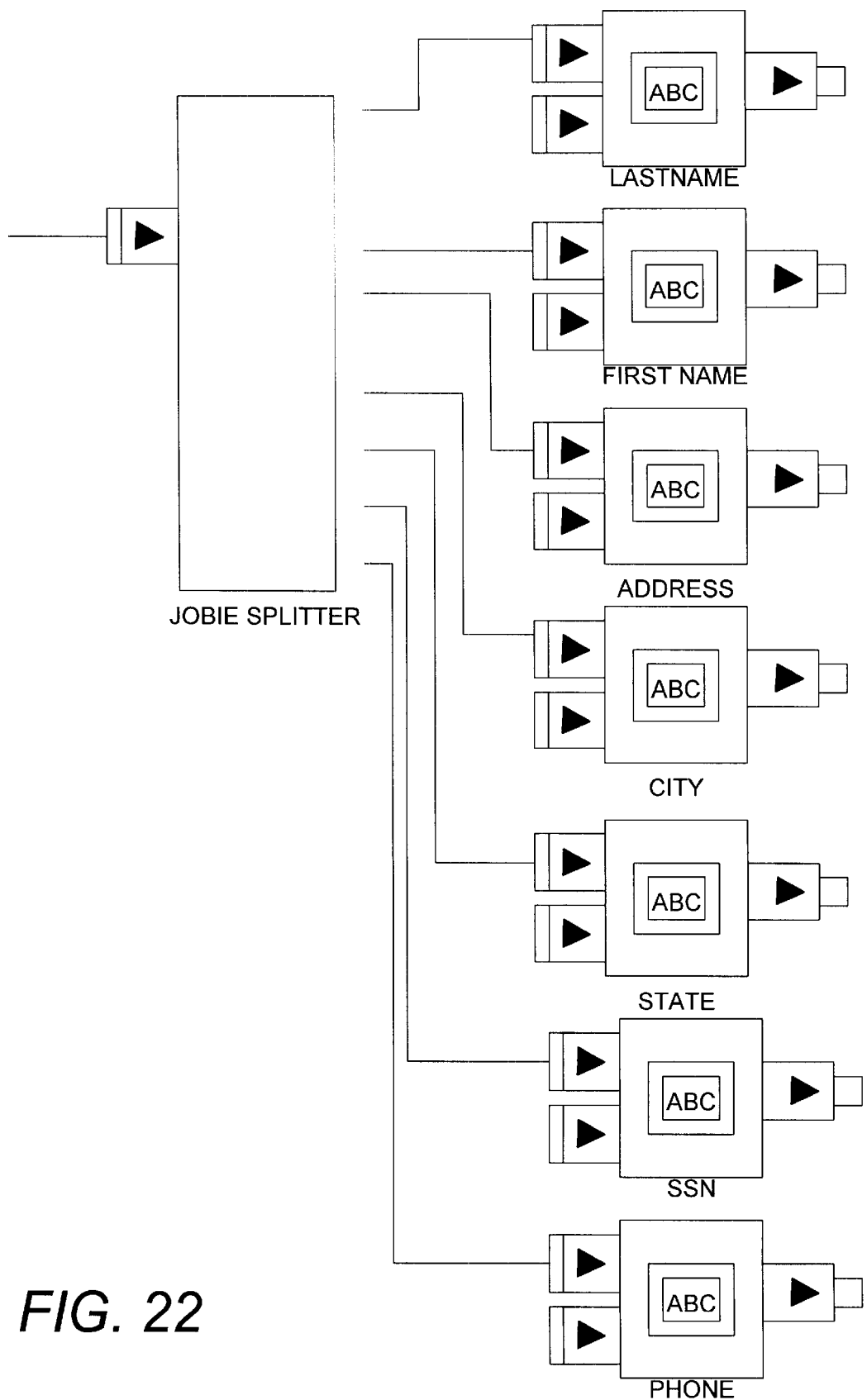

FIGS. 16–18 illustrate an alternate user interface in the form of a Java Studio based integrated development environment in which the apparatus (messenger, agent, assistant) is invoked as a Java Bean. A version of the apparatus invokable as a Java Bean is provided so that, in this case, the apparatus appears to be a Java Bean and may be invoked by, or invoke, other Java Beans.

The Java Studio™ contains a design panels FIG. 18, and a GUI panel, FIG. 17. The design panel supplies a pallet of Java Beans. When a Java Bean is dropped on the design panel, if it has a corresponding GUI element (e.g., the Java Bean might contain a GUI text field), the latter will appear in the GUI panel (and may be moved, resized, etc.). When a bean is selected, there is the opportunity, via a dialogue box, to customize it. Thus, for example, a bean providing arithmetic functions might be customized with different operators, new expressions, etc., while GUI beans might be customized with respect to size, colors, background colors, fonts, etc., and other attributes.

Methods in the beans are exposed as connectors, so that the beans can be wired together visually. Components communicate by sending and receiving messages through the connectors. Messages may be a value (normal input, output); a trigger (e.g., a signal to start an action).

Having created a design, one can generate an applet, standalone application, Java Bean, or "packaged design" (a single representation of the whole design, which may be used in future designs). (An enhancement to the integrated development environment might show, for example, the web page into which the new applet—if generation of an applet were selected—may be dropped.)

The GUI is active, so that, as the design is built, the resulting solution may also be tested. Key methods disclosed above (e.g., search, sort, . . . ) are made available as Java Beans or ActiveX components, and are usable independently. The apparatus itself is available as a Java Bean or ActiveX component, driven by a simple script, and may be used to create applications (business objects) of any degree of complexity. The apparatus supports the construction of full mission critical transaction or decision support solutions.

If the referenced data is distributed, the methods are invoked transparently, as parallel services—so that one may have transparent parallel data access and execution of methods across data distributed on the SMP nodes of a Unisys Cellular Multiprocessor, cluster, or network. The transparently accessed data may be heterogeneous: contained, for example, in NT files, SQL Server, Oracle, . . .

In the diagram of FIGS. 19–22, a search bean is shown driven by the indicated script. A "Personnel" database is imported, and is searched—with the command Personnel.search—for persons with a particular birthdate. If the "Personnel" database is distributed, the search methods will be run, automatically in parallel, across the distributed data. The search bean is easily customized by modifying the script. The example shows the supplied bean(s) being invoked by, and invoking, beans provided by Java Studio or by other bean "factories."

The considerable increase in performance of a system constructed according to the preferred embodiment may be illustrated in connection with an actual example concerning mining of the population of the United States. In this example, five million records, spread across 15 nodes, were searched, in serial, in 3 minutes, 27 seconds. Using a parallel search according to the preferred embodiment, the time was 17 seconds. If indices are built for the attributes of interest and searched in parallel, the search time is 4 seconds. If the indices are then cached, and the cached indices are searched in parallel, the search time is 1.2 seconds (some 172 times faster than the original serial search).

The times will often be linear, so that ten million records on 30 nodes, or 2,500,000 records on 8 nodes, will be searched in the same 1.2 seconds. The ability to search the population of the United States in less than 16 seconds portends a tremendous opportunity for completely new applications and solutions.

Another example of increased performance is a search of 15 million records across five nodes is illustrated in the following table:

|  |  | Serial | Parallel (preferred embodiment) | Improvement Times |
|---|---|---|---|---|
| NT file system | -search | 6 min, 32 sec. | 1 min. 22 sec. | 4.44 |
|  | -sort | 26 min, 26 sec. | 6 min., 8 sec. | 4.31 |
|  | -indexed search |  | 3 sec. | 130 |
| SQL Server | -search | 6 min., 11 sec. | 1 min., 20 sec. | 4.64 |
|  | -sort | 2 hr., 38 sec. | 25 min., 20 sec. | 4.76 |
| Oracle | -search | 14 min., 5 sec. | 3 min., 8 sec. | 4.49 |
|  | -sort | 3 hrs., 17 min., 43 sec. | 36 min., 18 sec. | 5.45 |

In the above example, servers were installed on five Aquanta systems, connected to a PC client with 10T Ethernet. The installation of the servers transformed the environment into a cluster or multiprocessor federation. In this way, the servers may be used, for example, to support a virtual data warehouse (the data in which may reside in heterogeneous databases where a database need not scale beyond the largest server).

As noted above, the preferred embodiment employs a function shipping model. An alternative model is a data shipping model in which, rather than the functions being performed as close to the data as possible, and only the results (e.g., the number of "hits" in a search) being returned to the requester, the data to be searched is passed to the requester and the function is performed there. This involves the transfer of much more data about the network, and, even with very high network or backplane bandwidths, typically increases the latency of the operations. The implemented model also ensures that the latest version of the data in question never resides in a cache on a different node (thus eliminating cache coherency problems).

Certain design considerations may also be noted at this point. Critical in terms of scaling and performance are concurrency (the degree of parallelism), contention (the degree of serialization) and coherency (the cost of consistency). An aim is to minimize contention and the cost of consistency. While one cannot totally eliminate contention, it is found that by performing updates as close to the data as possible (treating that server as largely independent of the others), and by randomizing the distribution of data across the servers (e.g., using hashing techniques), the contention is usually low (shown in almost linear scaling).

The cost of coherency (not having a later update in someone else's cache) is a quadratic term, placing a maximum on the possible scaling as servers are added. By performing updates on the server containing the data, one ensures that there will never be later updates in the cache on other servers, ensuring cache coherency, and eliminating this cause of a maximum in the possible scaling.

Additionally, the preferred embodiments discussed above have employed the creation of data descriptor files from the metadata at run-time. In alternate embodiments, all files can be held in the repository, which is then accessed from each server at run-time or a distributed repository system may be used where lightweight versions of the repository reside on the local server nodes.

The methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A method of accessing and operating upon heterogeneous data at a plurality of nodes comprising the steps of:
   (1) storing a plurality of messenger processes and a plurality of agent processes in a memory of a cellular multiprocessor wherein said cellular multiprocessor is partitioned into a plurality of groups of microprocessors, each partition corresponding to one of said nodes and being connected to control a database or databases located at each node;
   (2) propounding a request containing a data source object name wherein the heterogeneous data is treated as a single data source object, said request further containing at least one method to be performed on the data source object;
   (3) employing a first of said agent processes to determine whether the data source object is distributed across a plurality of nodes;
   (4) if the data source object is determined to be distributed, employing said first agent process to break the request into a plurality of new requests, each of said new requests having a format appropriate to one of the respective nodes; and
   (5) transmitting each of the new requests to its respective corresponding node via memory-based messaging provided by said cellular multiprocessor.

2. The method of claim 1 further comprising the step of executing the new requests concurrently on the data source object at the corresponding nodes.

3. The method of claim 1 further comprising the step of determining whether the data source object is stored locally or is non-distributed but stored remotely.

4. The method of claim 1 wherein a first agent process performs the step of determining whether the data source object is distributed.

5. The method of claim 4 wherein, in performing the step of determining, the first agent process consults a data source descriptor file containing a subset of data contained in a first repository of metadata.

6. The method of claim 5 wherein said first repository of metadata and said first agent process are located at a common node.

7. The method of claim 6 wherein the data source descriptor file is created from the repository at run-time.

8. The method of claim 4 wherein a first messenger process cooperates with said first agent process to transmit each said new request to its respective node.

9. The method of claim 8 wherein said request is in the form of a script and each said new request is in the form of a script having said format.

10. The method of claim 9 wherein said script and said new scripts are each in the form of a Java script.

11. The method of claim 8 wherein each of said nodes has associated therewith a respective database, and a respective agent process, each respective agent process comprising code selected to execute the respective new script with respect to the data source object as it is contained in the respective database.

12. The method of claim 11 wherein each of said databases is different from the remaining respective databases.

13. The method of claim 12 wherein the respective databases comprise at least two databases, each selected from the following group: Oracle database, NT database and SQL Server.

14. The method of claim 11 wherein each respective agent process accesses metadata located at the respective node in the course of executing the respective new script at that node.

15. The method of claim 14 wherein a data source descriptor file is created from the metadata at each respective node for use by the respective agent process, and wherein the descriptor file contents are stored in the dedicated memory of the partition of each respective node.

16. The method of claim 15 wherein the metadata comprises a collection of data source objects which reflect treatment of data stored in each respective database as a single object and wherein each of said data source objects is broken down into successive class levels.

17. The method of claim 16 wherein said class levels include a class comprising a System Node, System Server, Data Source Object, Field Desc and System Script.

18. The apparatus comprising:
   a plurality of databases, each located at a different node, each node comprising a partition of a cellular multiprocessor, and
   an agent code module associated with each node, each agent code module being constructed to determine whether a data source object presented in a script is distributed across a plurality of said nodes, and if said object is distributed, to break the script into a plurality of new scripts, each new script being suitable for execution at a respective one of said nodes.

19. The apparatus of claim 18 further including a messenger code module at each node for facilitating transmission of each of said new scripts to its respective node.

20. The apparatus of claim 18 where each said agent code module is operable to extract the data corresponding to said data source object from said database and to execute a method contained in said script on said data.

21. The apparatus of claim 20 further including a repository of metadata stored in a memory of said cellular multiprocessor, said metadata describing the contents of the data source objects available at each of said nodes.

22. The apparatus of claim 20 further including a repository application at each node for creating a data source descriptor file for use by the agent in extracting data from the database at that node.

23. The apparatus of claim 19 wherein each agent and messenger code module is stored in an area of memory accessible only to its associated partition.

24. The apparatus of claim 18 wherein said new scripts are transmitted by memory-based messaging to their respective nodes.

25. An article of manufacture comprising:

a computer usable medium having computer readable program code means embodied in said medium for accessing and executing methods on data at each of a plurality of nodes, each of said nodes comprising a partition of cellular multiprocessor, said data being treated as a single data source object, the computer readable code means being stored in a memory of said cellular multiprocessor and comprising:

means for receiving a request containing a data source object name wherein heterogeneous data is treated as a single data source object, said request further containing at least one method to be performed on the data source object;

means for determining whether the data source object is distributed across a plurality of said nodes, and if the data source object is determined to be distributed, breaking the request into a plurality of new requests, each of said new requests having a format appropriate to one of the respective nodes; and means for transmitting each of the new requests in parallel to its respective corresponding node.

26. The article of claim 25 where said computer readable code means further comprises means of executing the new requests concurrently on the data source object at the corresponding nodes.

27. The method of claim 26 where the computer readable code means further comprise means for determining whether the data source object is stored locally in the partition containing the agent making the determination or is non-distributed but stored remotely.

28. The method of claim 27 wherein said means for determining comprises a first agent process, said first agent process including means for consulting a data source descriptor file containing a subset of data contained in a first repository of metadata, said repository being stored in the memory of said cellular multiprocessor and accessible to each partition of said cellular multiprocessor.

* * * * *

UNITED STATES PATENT AND TRADEMARK OFFICE
CERTIFICATE OF CORRECTION

PATENT NO. : 6,490,585 B1
DATED : December 3, 2002
INVENTOR(S) : Charles Albin Hanson et al.

It is certified that error appears in the above-identified patent and that said Letters Patent is hereby corrected as shown below:

<u>Title page,</u>
Item [73], Assignee should read as follows:

-- Unisys Corporation, Blue Bell, PA. --

Signed and Sealed this

Eighteenth Day of March, 2003

JAMES E. ROGAN
*Director of the United States Patent and Trademark Office*